July 1, 1941.   H. E. CORBITT   2,247,361
AUTOMATIC VOLTAGE CONTROL DEVICE FOR ELECTRICAL PRECIPITATORS
Filed Jan. 27, 1939   9 Sheets-Sheet 1

INVENTOR.
Howard E. Corbitt
BY
ATTORNEY.

INVENTOR.
Howard E. Corbitt
BY
ATTORNEY.

July 1, 1941.  H. E. CORBITT  2,247,361
AUTOMATIC VOLTAGE CONTROL DEVICE FOR ELECTRICAL PRECIPITATORS
Filed Jan. 27, 1939    9 Sheets-Sheet 3
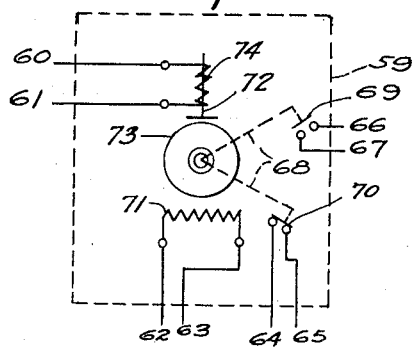
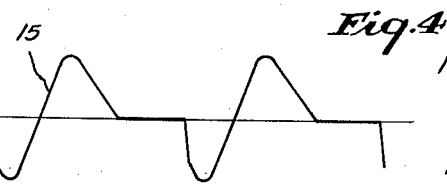
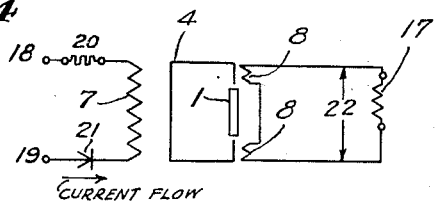
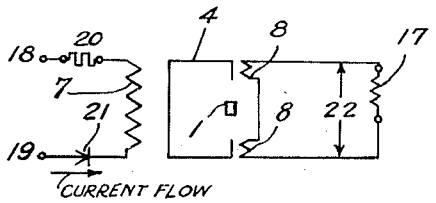
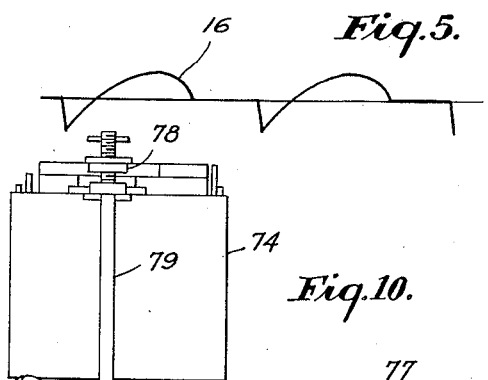
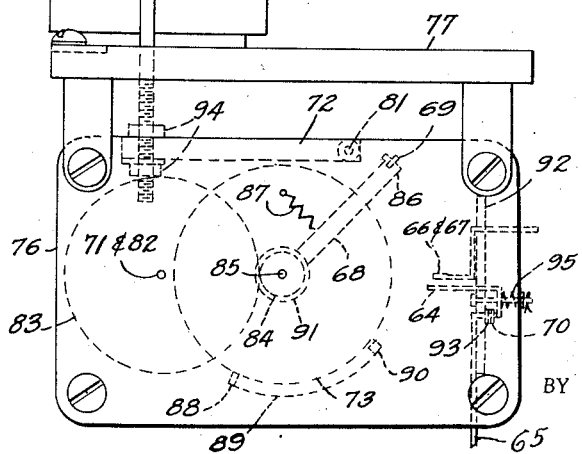
INVENTOR.
Howard E. Corbitt
BY
ATTORNEY.

July 1, 1941.   H. E. CORBITT   2,247,361
AUTOMATIC VOLTAGE CONTROL DEVICE FOR ELECTRICAL PRECIPITATORS
Filed Jan. 27, 1939   9 Sheets-Sheet 4

INVENTOR.
Howard E. Corbitt
BY
ATTORNEY.

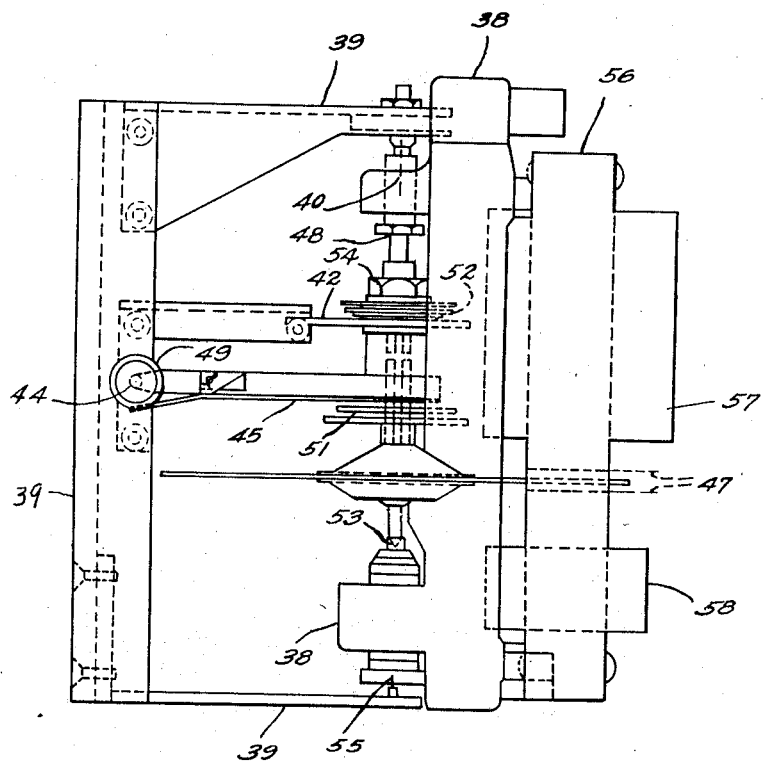

July 1, 1941. H. E. CORBITT 2,247,361
AUTOMATIC VOLTAGE CONTROL DEVICE FOR ELECTRICAL PRECIPITATORS
Filed Jan. 27, 1939 9 Sheets-Sheet 7

INVENTOR.
Howard E. Corbitt
BY
ATTORNEY.

July 1, 1941.   H. E. CORBITT   2,247,361
AUTOMATIC VOLTAGE CONTROL DEVICE FOR ELECTRICAL PRECIPITATORS
Filed Jan. 27, 1939   9 Sheets-Sheet 8

INVENTOR.
Howard. E. Corbitt
BY
ATTORNEY.

July 1, 1941. H. E. CORBITT 2,247,361
AUTOMATIC VOLTAGE CONTROL DEVICE FOR ELECTRICAL PRECIPITATORS
Filed Jan. 27, 1939     9 Sheets-Sheet 9

INVENTOR.
Howard E. Corbitt
BY
ATTORNEY.

Patented July 1, 1941

2,247,361

UNITED STATES PATENT OFFICE 2,247,361

AUTOMATIC VOLTAGE CONTROL DEVICE FOR ELECTRICAL PRECIPITATORS

Howard E. Corbitt, Alhambra, Calif., assignor to Percy E. Landolt, New York, N. Y., as trustee Application January 27, 1939, Serial No. 253,125

6 Claims. (Cl. 183—7)

The present invention relates to the art of electrical precipitation, and, more particularly to an improved device for automatically controlling the voltage in electrical precipitator systems.

As those skilled in the art know, in the ionization and precipitation of suspended particles from gases by what is known as the Cottrell electrical precipitation process, the efficiency of an installation depends largely upon the characteristics and the accuracy of control of the potential applied to the electrodes, as well as its magnitude. Likewise, the deposition of material upon the electrodes has an indirect effect upon the efficiency. By efficiency is meant the amount of material collected per unit of time divided by the amount of material entering the precipitator during the same time.

In conventional dust precipitator installations, it was customary to provide manual control of the operating voltage. Of course, these conventional precipitators had various serious disadvantages. Thus, first of all the manual control of the voltage required the services of a trained operator who had to be in constant attendance of the installation. In addition to this it has been found that it was practically impossible to provide accurate control of the voltage according to the operating conditions which would change quicker than it was possible for the operator to adjust the voltage. Moreover, the manual control frequently caused operation of the installation considerably below the optimum voltage which greatly reduced the efficiency of operation. Although these disadvantages were known for a considerable length of time and various suggestions and proposals were made to eliminate these disadvantages and to provide an automatic control of the voltage, none, as far as I am aware of these suggestions or proposals was completely satisfactory or successful in practical operation.

It is an object of the present invention to provide an automatic voltage control device for electrical precipitators which avoids the above disadvantages of the conventional manual control.

It is another object of the present invention to provide an electrical precipitator installation which is operated at maximum efficiency in a direct and automatic manner and which apart from the starting operation does not require any manual control or attendance whatsoever.

It is a further object of the present invention to provide an automatic control device for the voltage of electrical precipitators which is relatively simple in construction and fool-proof and automatic in operation.

It is also within contemplation of the invention to provide a polarity device for the rectifier motor of electrical precipitators which automatically corrects the polarity of the rectified current so that the out-put is connected with the correct and desired polarity to the load.

The invention also contemplates the provision of a novel and improved apparatus for precipitating suspended particles from gases which involves automatically maintaining the potential difference between the precipitator electrodes substantially at the snapping voltage whereby maximum efficiency of operation may be obtained.

Other and further objects and advantages of the present invention will become apparent from the following description taken in conjunction with the accompanying drawings, in which:

Figs. 4 and 5 show two possible wave forms that may be obtained with the polarity device when it is operating as shown in the wiring diagram of Fig. 6;

Fig. 10 is a front elevation of the time delay relay diagrammatically shown in Fig. 5;

Broadly stated, according to the principles of the present invention a control device is provided which is capable of automatically adjusting the operating voltage of an electrical precipitator system to an optimum value. As those skilled in the art know, the efficiency is a function of the amount of current passing from the discharge to the collecting electrodes per unit length of electrode. Below corona voltage this current is very low. If the current is in the form of a concentrated arc the current distribution is poor. In a commercial installation, if the potential is gradually increased from the initial corona voltage a value will be reached at which snaps occur. That is, the potential is sufficient occasionally to cause an arc-over of very short duration, but insufficient to cause a power arc. The snaps occur indiscriminately throughout the precipitator. If this potential is further increased, a power arc occurs with resultant loss of evenly distributed current and loss of potential, in other words, a marked decrease in efficiency is caused. Therefore, the maximum efficiency is obtained at the correct-polarity potential sufficient to cause occasional snaps. This is termed the snapping voltage. If the spacing of the electrodes is changed by the deposition of solids, then the value of the snapping voltage changes. The snapping voltage varies with almost any change in gas condition or electrode spacing.

I have discovered that because the snapping voltage and maximum efficiency occur simultaneously and independently of other variables, its effect may be used to obtain automatic operation. A snapping voltage may be observed in several ways, the easiest, probably, by observing the ammeter fluctuations in the primary circuit of the high-voltage transformer. The snapping voltage may occur at practically any value of primary current, so that preferably a rate-of-change relay is employed rather than a device actuated by any specific electrical quantity.

In conjunction with this surge or rate-of-change relay, I provide a current-regulating relay arranged for control of the current setting from a remote point over a range from a minimum to a maximum by means of a rheostat in the primary circuit of a pilot winding. I found that it is advantageous to provide an auxiliary time delay unit to prevent false operation of the rate-of-change relay during the adjustment of the operating voltage including tap changing of the high voltage transformers.

In addition to the automatic control of the voltage, I found that it is necessary to assure complete automatic operation including automatic control and correction of the polarity. Therefore, I also provide a polarity device of novel and improved character which automatically adjusts the polarity of the direct current, high voltage out-put.

The invention will now be more fully described to those skilled in the art in conjunction with the accompanying drawings.

Figure 1:
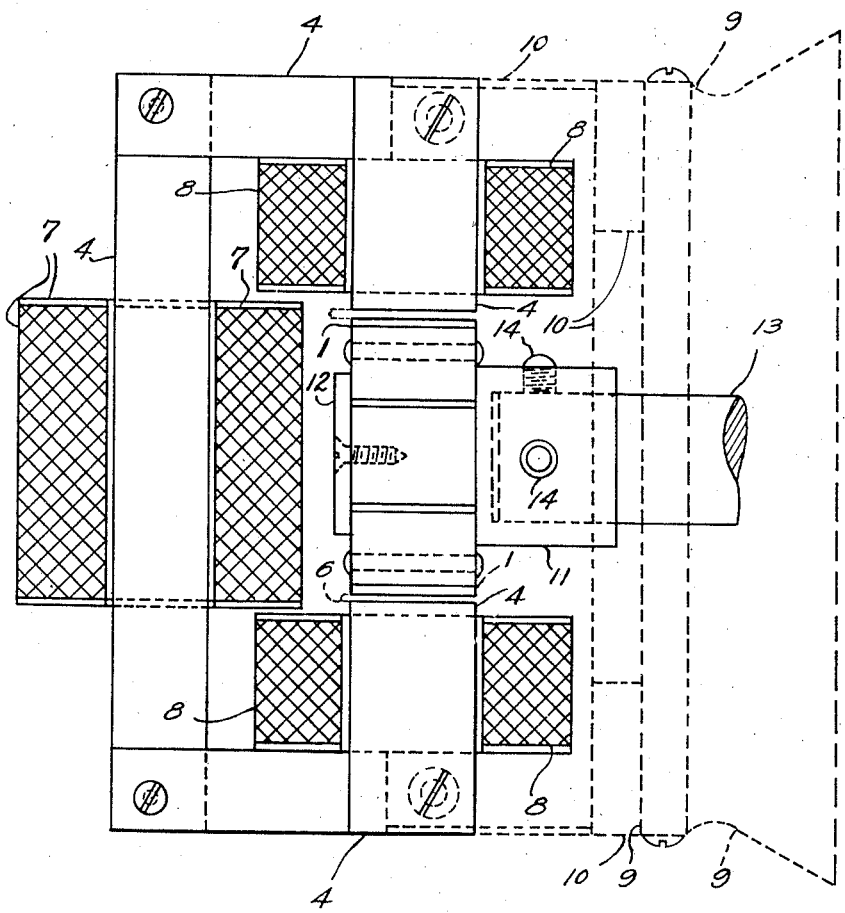
Fig. 1 illustrates a side elevational view having parts in section of the polarity device embodying the present invention.

Fig. 1 illustrates a side elevational view having parts in section of a polarity device embodying the principles of the present invention and drawn to approximately full scale. Reference character 4 denotes the laminated iron stator which is attached to the end frame of rectifier motor 9 by means of a brass casting 10; 1 denotes the laminated iron rotor attached to a brass casting 11 and held in position by means of clip 12 and a screw associated therewith. Around stator frame 4 at about its mid-point is provided a primary coil 7 having its terminals connected to a source of alternating current through a resistor and a half-wave rectifier. Also around the stator frame 4 are provided two secondary coils 8 being positioned as close to air gap 6 as practicable. These secondary coils are connected in series and their terminals are connected to the operating coil of a single-pole relay. In Fig. 1, rotor 1 is shown in the position which presents a minimum air gap 6. If the rotor 1 was rotating synchronously in this position and at this synchronous time the half-wave rectifier permitted current to pass through coil 7, then coils 8 would present their maximum potential to the terminals of the operating relay above mentioned. 13 is rectifier motor shaft and 14 is set screws for attaching 11 to said shaft.

Figure 3:
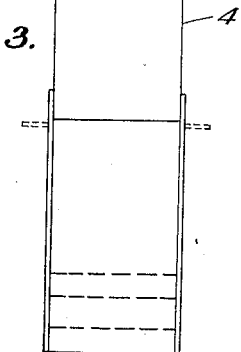
Fig. 3 shows a front elevation of the stator frame assembly of the polarity device.
Figure 2:
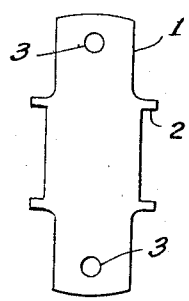
Fig. 2 depicts one of the laminations employed in the rotor of the polarity device.

The shape of the laminations employed in the polarity device will be best seen in Figs. 2 and 3. Of these, Fig. 2 shows a front elevation of one lamination of the iron rotor of the polarity device, reference character 1 denoting the lamination itself. Lamination 1 is provided with four ears 2 projecting outwardly in such a manner that a casting may be attached to the central body of the assembled laminations. Rivet holes 3 are provided in the laminations for connecting them into a rigid and unitary structure. Fig. 3 shows a front elevational view of the stator laminations iron frame after assembly and as it would appear when viewed from the end of the rectifier motor. Reference character 4 denotes the stator assembly, and reference character 5 denotes the four outermost laminations, the extensions of which are bent back as shown by the dotted lines after the coils are slipped in place.

Figure 6:
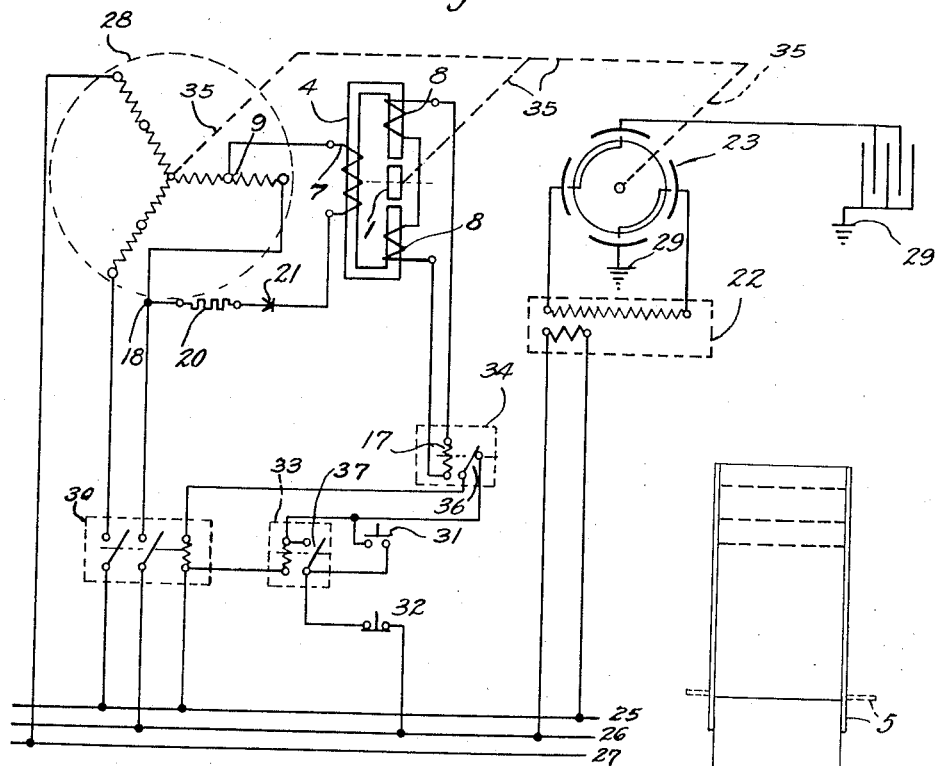
Fig. 6 is a complete wiring diagram of the polarity device embodying the invention.

The operation of the polarity device embodying the present invention will be best understood from Fig. 6. Reference character 22 denotes a high voltage transformer, the secondary winding of which is connected to a mechanical rectifier 23, the rectified high voltage current being supplied to a precipitator 24. The primary winding of high voltage transformer 22 is connected to leads 25 and 26 of a source of three-phase alternating current 25, 26 and 27. The mechanical rectifier is driven by means of a 4-pole, three-phase squirrel cage induction motor 28 having slots cut in its iron rotor to simulate a 4-pole machine, this motor starting as an induction motor and running as a synchronous motor having no brushes or separate excitation. Obviously, motor 28 may come up to synchronous speed in two positions with respect to mechanical rectifier 23 which is mounted directly on the shaft of the rotor of motor 28. Thus, assuming that the rotor of mechanical rectifier 23 has a certain point thereon synchronously opposite to the stator shoe connected to ground 29, then a change of 180 mechanical degrees would not change the polarity of 29. A change of 90 mechanical degrees, however, in either direction would change the polarity of ground 29. In other words, motor 28 may come up to synchronous speed so that ground 29 is positive, and it also may come up to speed so that ground would be of the opposite polarity, or negative. Normal precipitation requires that ground 29 be positive. The circuit and associated devices shown in Fig. 6 are of such character that the ground may be automatically maintained at preferred and pre-selected polarity and that this selection may be obtained before transformer 22 is connected to the power line, without requiring any brushes or similar frictional devices on motor 28.

One phase of the power supply, lead 27, is directly connected to one lead of three-phase rectifier motor 28. The other two leads 25 and 26 are connected to the remaining two leads of rectifier motor 28 through a two-pole magnetic switch 30. A start push button 31 of the momentary ake type and a stop push button of the momentary break type 32 are provided. The circuit also includes an auxiliary relay 33 which is single-pole, open when de-energized, magnetically operated switch, and a polarity device relay 34 which is a single-pole, closed when de-energized, magnetically operated switch. The polarity selector device proper comprises an iron stator 4 mounted on the end frame of rectifier motor 28; and an iron rotor 1 attached directly to the rotor of the rectifier motor 28 as indicated by dotted line 35. Rotor 1 is so positioned as to form part of the magnetic circuit of stator 4. On stator 4 is wound a primary coil 7 and close to the air gaps between rotor and stator, but around the stator, are wound two secondary coils 8 forming a secondary circuit under the transformer action of primary coil 7. A low voltage tap 19 from one phase of the rectifier motor is connected to one terminal of primary winding 7, and the other terminal is connected to this low voltage through a half-wave rectifier 21 and a resistor 20. These connections are made on the motor side of motor starter switch 30 so that this circuit is open when the motor starter switch is open.

When it is desired to place rectifier motor 28 in operation, push button 31 is momentarily depressed. This connects power supply lead 26 through the closed contact of push button 32 to one terminal of the operating coil of auxiliary relay 33, the other terminal of this operating coil being connected to lead 25 of the power supply. This operates relay 33 which closes its single-pole contact causing current to flow from power supply lead 26 through closed contact push button 32, through the now closed contact of auxiliary relay 33 to its own operating coil terminal and thence back to power supply lead 25. The auxiliary relay will remain in this position until push button 32 is momentarily opened. Upon such actuation of relay 33, motor starter switch 30 will be energized as follows: Current flows from power supply lead 25 through the operating coil of motor starter switch 30, through the closed contacts of the single pole polarity device relay 34 and back to power supply lead 26 through the now closed contacts of relay 33 and closed contact of push button 32. Thus, the two-pole motor starter switch 30 is actuated and closes its contacts, applying the three-phase power supply lead 25, 26, and 27 to the leads of rectifier motor 28. When the motor is energized, potential is applied to the primary winding of polarity device 7 through a reduced voltage tap described in the foregoing. The secondary coils of this polarity device 8 are connected to the operating coil of single-pole relay 34. As motor 28 reaches synchronous speed, a potential appears across the operating coil of relay 34 and its magnitude depends upon the relation between the direction of current flow through the half-wave rectifier 21 and the synchronous position occupied by the polarity device rotor 1 with respect to its stator 4. Sufficient time is required to cause the closed contact 36 of polarity device relay 34 to operate so that the starting of rectifier motor 28 cannot cause contact 36 to operate until synchronous speed is reached. Therefore, only potentials applied to operating coil 17 during synchronous operation of rectifier motor 28 need be considered.

If the half-wave rectifier 21 permits current to flow at a time when rotor 1 is in such a position as to provide a minimum air gap in the magnetic circuit of 4 and 1, then a large voltage will be applied across the operating coil of relay 34. Relay 34 is so adjusted as to be operated by this potential opening single-pole contact 36, thus in turn opening the operating coil circuit of motor starter 30. As soon as this motor starter 30 opens the circuit of motor 28, the potential is removed from the operating coil of polarity device relay 34. This causes its contact 36 to close again which in turn energizes motor starter 30 and also energizes motor 28. When contact 36 of relay 34 is adjusted for proper timing, motor 28 may be removed from power leads 25 and 26 and reconnected in such a manner that rectifier motor 28 will drop back one or an odd number of poles which is required for correcting the wrong polarity of mechanical rectifier 23.

If motor 28 comes up to speed and mechanical rectifier 23 is 90 mechanical degrees earlier or later than that assumed in the above illustration, and the half-wave rectifier 21 allows current to pass synchronously as before, rotor 1 of the polarity device will be in such synchronous position as to provide a maximum air gap in the magnetic path of stator 4 and rotor 1. Of course, it is assumed that the mechanical rectifier 23 is maintained in its previous mechanical relationship on the shaft of motor 28 with respect to rotor 1. A minimum potential now appears across the terminals of operating relay coil 17 because the transformer action of primary coil 7 upon secondary coils 8 is greatly decreased due to flux leakage. This potential is insufficient to operate relay 34, as it may easily be as little as one-third of the potential required to operate the relay. This is the condition of normal operation when the polarity of the mechanical rectifier 23 is correct with respect to the precipitator 24.

Figure 5:
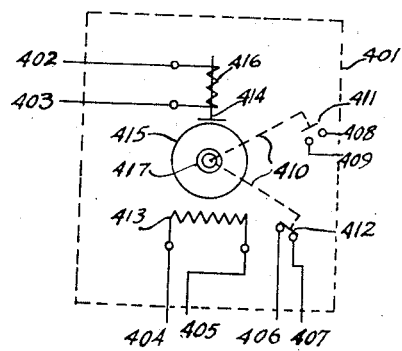
Figure 6:
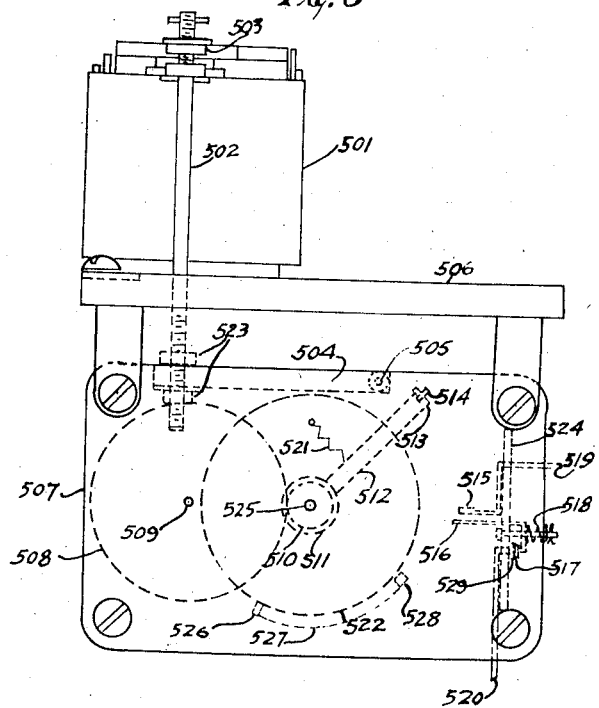

Figs. 4 and 5 depict the wave forms obtained from the polarity device embodying the present invention and represent two possible synchronous positions. Reference character 15 in Fig. 4 denotes the wave form which is sufficient to operate relay coil 17, while 16 in Fig. 5 denotes the wave form which is insufficient to actuate the relay. The circuits shown in Figs. 4 and 5 are identical in all respects, except the synchronous position of the rotor 1 is different. Terminals 18 and 19 are connected to a source of alternating current which is connected in series with a resistor 20, with primary coil 7 of the polarity device, and a half-wave rectifier 21. The magnetic circuit of the device is formed by an iron stator 4 and an iron rotor 1. In Fig. 4 stator and rotor are shown in the synchronous position of minimum air gap while the current is passed by rectifier 21 and in Fig. 5 stator and rotor are shown in the synchronous position of maximum air gap while the current is passed by rectifier 21. Stator 4 carries two secondary polarity device coils 8 which are connected in series with each other and with a relay coil 17. Reference character 22 indicates the points between which a cathode ray oscillograph was connected to obtain oscillograms 15 and 16.

Figure 7:
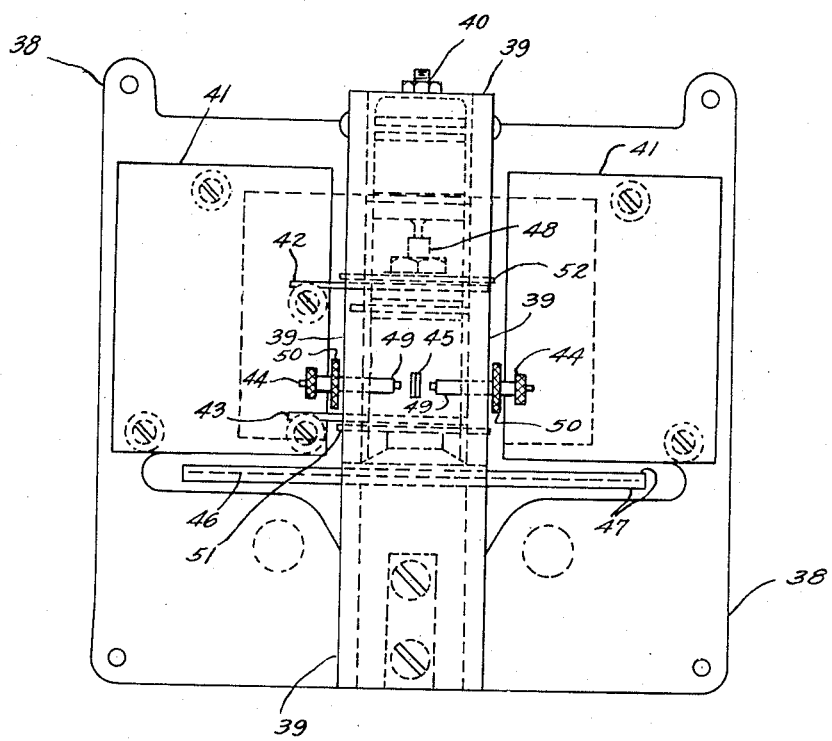
Fig. 7 is a front elevational view of a rate-of-change relay forming part of an installation embodying the invention.
Figure 8:
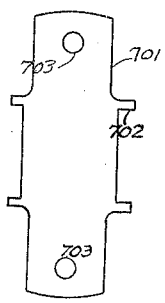
Fig. 8 illustrates a side elevational view of the relay shown in Fig. 3.

Figs. 7 and 8 illustrate the essential parts of the rate-of-change relay employed in the circuits embodying the present invention, Fig. 7 being a front elevational view and Fig. 8 a side elevational view. Reference character 38 denotes the metal support frame in which a movable disc 40 is mounted in separate lower and upper bearings 53 and 48, respectively. Disc 46 carries contact 45 connected through a spiral spring and having an electrical connection 42 made to a fixed insulating plate 41 by means of another spiral spring. 51 and 52 are insulating spools attached to the shaft of disc 46 in order to keep elements 44 and 49 insulated from element 45 and from metal frame 38. These spools may be adjusted by means of a nut 54. Moving disc 46 has an arm 45 attached thereto through a spiral spring, said arm carrying a contact at the outer end thereof. The other moving element 39 is mounted in bearings 40 and 55 in line with bearings 48 and 53 of moving disc 46. Moving element 39 has a very substantial mass and is connected to disc 46 through a spiral spring 42. The contacts of moving element 39 are denoted by reference character 49 and may be adjusted by means of set screws 44 and nuts 50. These contacts are electrically connected together and are insulated from element 45. The fixed contact from these moving contacts 49 is brought out to an insulated plate through a spiral spring. The air gap of the magnetic circuit 56 is denoted by reference characters 49 and may be adjusted by 46 and heavy mass moving member 39 are under the influence of a potential coil 57 and of a current coil 58. In view of the fact that this rate-of-change relay is well known to those skilled in the art and does not form part of the present invention, no detailed description of its operation is believed to be necessary and it will be sufficient to note that the contacts will be actuated in case there are any sudden changes or surges in the circuits in which the potential and current coils are connected whereas slow and gradual changes in the circuit will cause relative displacement of the light and heavy mass moving members so that no contacts are actuated.

Figure 9:
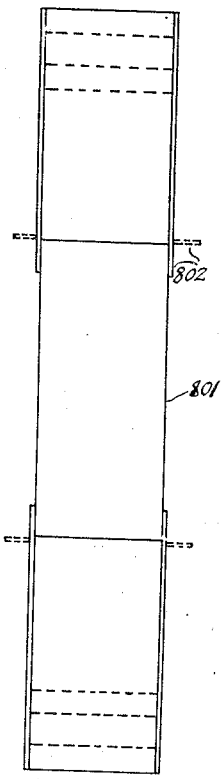
Fig. 9 depicts a diagrammatic view of an instantaneous open, time delay close relay.

Fig. 9 depicts a schematic wiring diagram of a motor-driven time delay relay 59 of the type employed in the circuits of the present invention. Reference character 71 denotes a motor which is operatively associated with a speed reducer and with differential gears 75. One of said gears carries an arm 68, one carries a brake drum wheel 73, and the third one of said gears is driven by the speed reducer. Brake drum 73 is under the influence of a brake arm 72 and of a brake coil 74 having terminals 60 and 61. Motor 71 is of the unidirectional type and is connected to terminals 62 and 63. Movable arm 68 controls two sets of contacts of which one set of contacts, 70, is connected to terminals 64 and 65 and the other set of contacts 69 is connected to terminals 66 and 67.

When motor 71 of the relay is energized, due to the action of the differential gears, no displacement of arm 68 takes place unless brake arm 72 is pressed against drum 73 by the action of brake coil 74 in the energized condition thereof. Assuming that both motor 71 and brake coil 74 are energized, brake arm 72 will be actuated to hold brake drum 73 and due to the action of the differential gears will slowly move arm 68 in a clockwise direction. At the extreme limit of travel in this direction, arm 68 closes contact 69 and opens contact 70 which is held in place by spring 95. Contact 70 may be connected in series with motor winding 71 which thus may be de-energized when contact 70 is opened. When brake 74 is de-energized, brake arm 72 will release its pressure on brake drum 73. A spring tensioned during the clockwise displacement of the arm will quickly move the brake drum in a counterclockwise direction until it strikes against a stop. Hereafter, arm 68 moves with drum 73, quickly opens contact 69 and closes contact 70, thus energizing again motor winding 71. If now brake coil 74 is also energized, brake arm 72 will be pressed against brake drum 73 causing arm 68 to slowly move in a clockwise direction until the extremity of its travel is reached. Thus, the relay opens contact 69 instantaneously and closes it with a time delay, while contact 70 is closed instantaneously and is opened with a definite time delay.

Fig. 10 depicts a front elevational view of the time delay relay diagrammatically shown in Fig. 9. Reference character 76 denotes the front plate of a frame to which is attached supporting frame 77. Frame 77 carries a brake coil 74, a brake coil armature 78 and a brake rod 79. The lower end of this rod is attached to an arm 72 by means of nuts 94. Arm 72 is pivoted at 81 to the front plate of frame 76. In the de-energized condition of brake coil 74, illustrated in Fig. 10, arm 72 does not press against the periphery of brake drum 73 but as soon as brake coil 74 is energized, armature 78 moves in a downward direction, carrying brake rod 79 with it which in turn depresses arm 72 causing it to press tightly against drum 73. The motor and speed reducer (71 and 82) has its slow speed shaft connected to gear 83 which gear in turn meshes with a pinion 84 mounted on shaft 85. The horizontal gear of the differential gear assembly carries an arm 68 provided with contacts 69 and contact point 86. A spring 87 has its ends attached to the front plate of frame 76 and to movable arm 68 respectively, urging arm 68 to move in a counterclockwise direction. A stop 88 is attached to drum 73 and may move through arc 89 and strike against a fixed stop pin 90 which limits the travel of arm 68 under the influence of spring 87. When both motor 71 and brake coil 74 are energized, brake arm 72 holds drum 73 in a fixed position while gears 83 and 84 revolve whereby arm 68 is caused to move in a clockwise direction against the action of spring 87. Drum 73 is rigidly connected to the remaining outer vertically driven gear of the differential gear assembly so that arm 68 moves in clockwise direction at the same angular speed as pinion 91. The displacement of arm 68 is limited by the point where movable contact 69 strikes against fixed contacts (66 and 67) and by the point where contact point 86 on arm 68 strikes against arm 92 which is a continuation of contact 70. Arm 64 moves slightly downward and raises contact 70 away from contact 93 thus opening this circuit. Normally, this set of contacts 70 and 93 with their terminals 64 and 65 is connected in series with the motor winding of the relay so that the motor is de-energized when these contacts are open. If brake coil 74 is de-energized, spring 87 causes arm 68 to rotate in a counterclockwise direction opening contacts 66 and 67 and closing contacts 70 and 93. The motor of the relay is now energized, stop 88 will be resting against fixed pin 90, contacts 70 and 93 are closed and contacts 66 and 67 are open. Reference character 92 denotes an insulating plate holding contacts 66 and 67 and 64 with their associated mechanism. From the foregoing description, the operation of the motor driven time delay relay will be readily understood by those skilled in the art without any further explanation.

Figure 11:
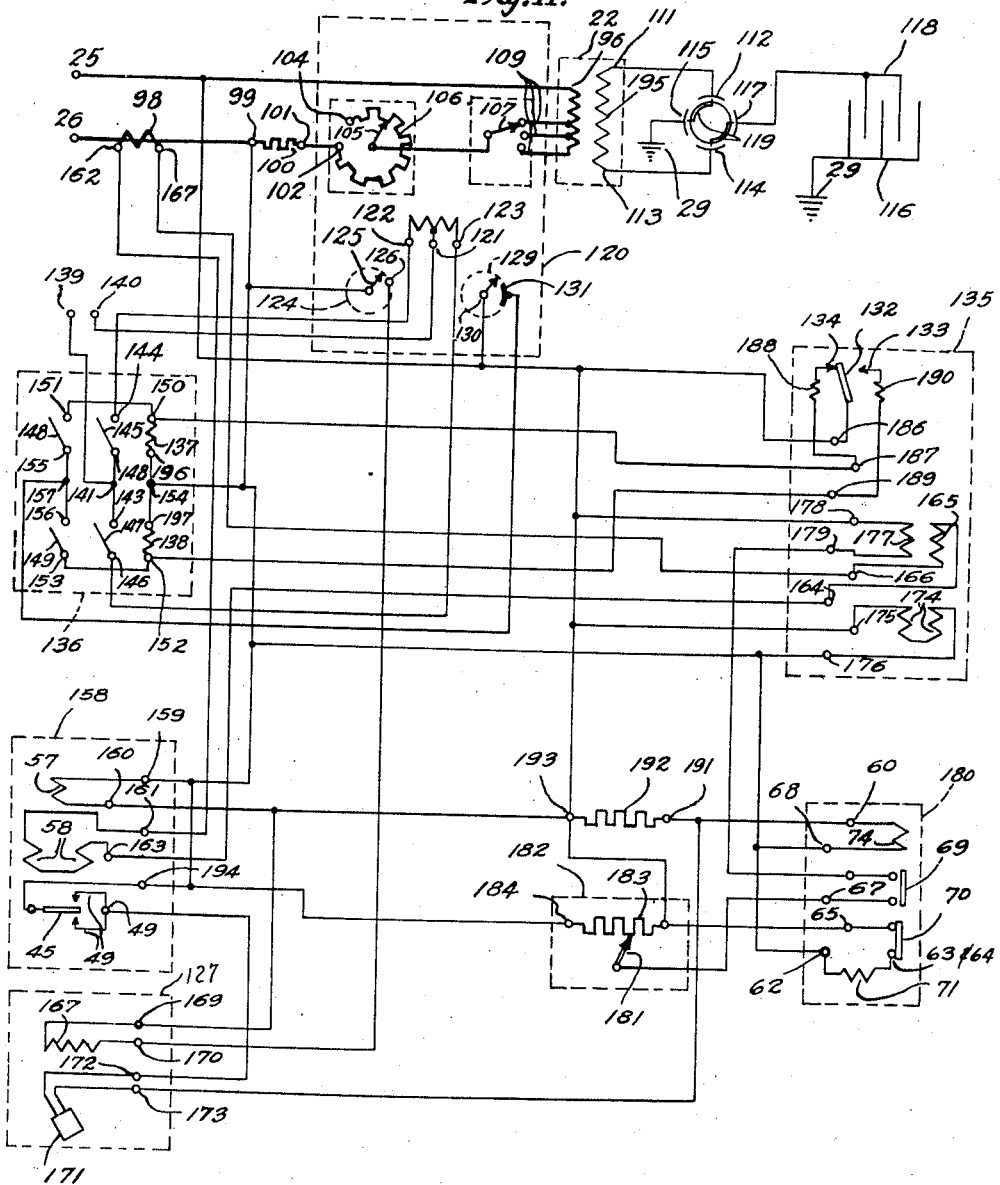
Fig. 11 depicts a complete circuit diagram of the voltage control device embodying the invention.

Fig. 11 illustrates a simplified circuit diagram of the automatic voltage control device embodying the present invention and for the sake of clarity omits the polarity device. A source of single-phase alternating current is denoted by reference characters 25 and 26. The power circuit consists of the following: Lead 25 connects directly to lead 96, which is one terminal of primary winding 97 of high-voltage transformer 22. Lead 26 connects to the primary of the instrument current transformer 98, thence to terminal 99 of fixed resistor 100. The remaining terminal 101 of fixed resistor 100 is connected to one terminal 102 of variable resistor 103. The opposite terminal 104 of variable resistor 103 is not rigidly connected to any part of the circuit. Variable arm 105 contacts various segments of variable resistor 103. The variable resistor itself is denoted by reference character 106. Variable arm 105 is connected to movable arm 107 of transformer tap switch 108, the fixed contacts 109 of which are connected to reduced voltage taps on the high voltage transformer primary 97. The end terminal of the high voltage transformer primary 110 is connected to the last fixed contact 109 of the transformer tap switch 108. The secondary circuit of high voltage transformer 22 is connected as follows: One terminal, 111, of high voltage transformer 22 is connected to stator shoe 112 of the mechanical rectifier while the opposite terminal 113 of this transformer is connected to a stator shoe 114 which is located 180 mechanical degrees from the terminal 112 above mentioned. One of the remaining stator shoes 115 of the total of four stator shoes used is connected to ground 29, through ground 29 to the precipitator collecting electrodes 116. The remaining stator shoe 117 of the mechanical rectifier located 180 mechanical degrees from stator shoe 115 is connected to the discharge electrodes of the precipitator 118. The rotor of the mechanical rectifier has two terminals 119. Each terminal of the rotor discovers about 90 mechanical degrees of the rotor periphery, there being about 90 mechanical degrees between one terminal, or connecting strip 119 and the other, this space being composed of an insulating material.

The current regulator 120 is composed of 5 main parts: (1) a direct current reversible motor having a center tap 121, one outside terminal 122, and another outside terminal 123. (2) a variable resistor 103 connected to said motor through a slow speed shaft. (3) a reduced voltage tap-switch 108 connected to the motor through a slow speed shaft and a Geneva motion gear. The single-toothed gear of the Geneva motion is directly connected to the slow speed shaft, while the plurality-toothed gear is connected to movable arm 107 of tap-switch 108. (4) a control switch 124, having a movable arm 125 connected to the slow speed shaft of the motor, and a fixed contact 126. The purpose of this switch is to energize mercury tube time delay relay 127 when the tap switch 108 is being operated in order to prevent false operation of the rate-of-change relay 128. (5) a control switch 129 having a movable arm 130 connected to the slow speed shaft of the motor and a fixed contact 131, covering a number of degrees of angular rotation of movable arm 130. Its purpose is to keep the regulator motor (122, 123, 121) energized during the time required for the tap switch 108 to operate. During this operation, the motor operating contacts 132, 133, 134 of the current balance relay 135 may open and the regulator motor would thus be de-energized as the tap-changing operation was taking place. This is prevented by control switch 129 as will be explained more fully hereinafter.

The remaining relays and attendant resistors completing the voltage control system are as follows: The regulator motor (122, 123, 121) reversing relay, 136, is composed of two 2-pole relays with separate operating coils 137 and 138. All contacts are open when the coils are de-energized. A direct current source is represented by leads 139 and 140. Lead 140 connects to the center tap 121 of the regulator motor. Lead 139 connects to the terminal 141 which is connected to one pole, 142, of one of the reversing relays, and to terminal 143 of the other relay. Fixed contact 144 of one relay may be connected with terminal 142, through movable contact 145, to terminal 122 of the reversible motor, thus driving this regulator motor in one direction. Contact 146 may connect with terminal 143 through movable arm 147, which connects contact 146 with terminal 123 of the reversible regulator motor, and drives this motor in a direction opposite to the former. Operating coil 137 causes movable contacts 145 and 148 to operate, while operating coil 138 causes movable contacts 149 and 147 to operate. Terminal 150 of operating coil 137 is connected to fixed contact 151. Terminal 152 of operating coil 138 connects to contact 153. The opposite ends of operating coils 137 and 138 are connected together and at connection 154, connect to the alternating current source 99 and thereby, to 26. Movable arm 148 which, when closed, makes contact with contact 151, has a fixed contact 155. Movable contact arm 149 which, when closed, makes contact with contact 156, has a fixed contact 153. Contacts 155 and 156 are connected together and through this connection 157 are connected to the stationary segment 131 of control switch 129 of the current regulator 120. These two relays are mechanically interlocked.

Rate-of-change relay 158 operates on the principle of a wattmeter. It has a potential coil 57, one terminal of which, 159, connects to supply source lead 26 and the other terminal, 160, connects to supply source lead 25. Current coil 58 has two terminals, one of which, 161, connects to terminal 162, which is one side of the secondary winding of instrument current transformer 98. The remaining terminal 163 of current coil 58 is connected to terminal 164 of current coil 165 of current balance relay 135, through this coil, 165 to terminal 166, and thence back to the remaining terminal 167 of the secondary winding of the instrument current transformer 98. In other words, the current coils of both relays are connected in series with the current transformer. One movable contact 45 of this rate-of-change relay is attached to the movable disc of the wattmeter type relay 158 by means of a spring. This contact has little mass and, therefore, can move rapidly. The other contact 49 is also movable, and placed in close proximity to contact 45, with which it can make contact. This latter contact 49 is also driven through a spring attached to the movable disc, the same as element 45, but it is electrically insulated therefrom, and mounted on separate bearings. Its mass is great compared to contact arm 45, and, therefore, it can move only slowly. If the current through the current coil 58 changes quickly, the change in torque on the disc attached to the two elements 45 and 49 will cause the element 45 to move quickly and element 49 to follow slowly. Therefore, element 45 strikes 49 one or more times until the elements take up their new positions, or until such time as the current through coil 58 ceases to change rapidly. Gradual changes in current through coil 58 permit elements 45 and 49 to move essentially uniformly, so that no contact is made between them.

Relay 127 is a mercury tube switch time delay relay. It is provided with an operating solenoid 167 and a mercury tube switch 168. The operating coil terminal 169 is connected to the power source lead 25. Its other terminal 170 is connected to fixed contact 126 of control switch 124. The moving contact of switch 124 is 125, and is connected to power source lead 26. When the solenoid 167 is energized tube 171 is tipped through a large number of degrees which throws the mercury from the bottom of the tube to its normal top. This opens the circuit of leads 172 and 173 which emerge from the tube. When solenoid 167 is de-energized, mercury tube switch 171 is thrown back to its original position, but the mercury is required to flow through a small hole in order to get to the bottom of the tube. This, however, requires time so that the contacts located near the bottom of the tube are not immediately closed by the mercury, but a more or less definite time must elapse before these contacts close. Thus, the mercury relay is of the "quick-open and definite time delay close" type.

The current balance relay 135 is of the wattmeter type. It is provided with a potential coil 174, one terminal of which 175, connects to power source lead 25 and the remaining terminal, 176, to power source lead 26. It has two current coils, of which one, 165, has been described. The other, 177, is designed to oppose 165. Control current coil 177 has two terminals, 178 and 179. Terminal 178 connects to power source lead 25, while terminal 179 connects to terminal 66, thence to movable contact 69, and back to terminal 67 of time delay relay 180. Terminal 67 is connected to movable arm 181 of potentiometer 182. The resistance of this element 183 has two fixed terminals 184 and 185. Terminal 184 connects to power source lead 26, while terminal 185 connects to power source lead 25. Current balance relay 135 has two fixed contacts and one movable contact. The movable contact 132 is attached to the disc of the wattmeter type relay through a spring and gears. Terminal 186 connects to this movable element 132. Element 132 is so adjusted as to make contact with one fixed contact 134 when de-energized. Terminal 187 connects to a magnetic holding coil 188 and through this to contact 134. The magnetic holding coil 188 is provided to reduce or prevent chattering at the contacts 132, 134. Terminal 189 connects to a magnetic holding coil 190 and through this to fixed contact 133. Movable contact 132 is arranged so that at one extremity of travel it strikes contact 134 and at the other extremity of travel it strikes contact 133. It cannot strike both contacts 133 and 134 simultaneously. As current coil 177 provides a torque in opposition to that of current coil 165, the movable element 132 attached to the disc through a spring and gears, may, at various values of currents through these coils have no resultant torque so that it will cease to move.

Time delay relay 180 is a motor driven device, mechanical in operation. The motor 71 is unidirectional, it drives contact arms 69 and 70 through a speed reducer and differential gears. A magnetic brake coil 74 energizes or de-energizes contacts 69 and 70. One terminal 62 of the motor field winding 71 connects to the power source lead 26. The other end of this motor field winding connects to one fixed terminal 63 and 64 of contactor 70, while the movable contact of 70 connects to terminal 65 and thence to power supply source lead 25. Contactor 70 is closed when motor 71 is energized and is open when the motor is de-energized. Contactor 69 is open when the motor 71 is energized and is closed when the motor is de-energized. It opens instantaneously and closes with time, and has two fixed terminals 66 and 67. Terminal 66 connects to terminal 179 of the current balance relay, terminal 67 connects to the movable arm, 181 of potentiometer 182. Brake coil 74 has two terminals, 60 and 61 of which terminal 61 connects directly to power source lead 26, while terminal 60 connects to terminal 191 of resistor 192, and to terminal 173 of the mercury tube time delay relay 127. The other terminal 193 of resistor 192 connects directly to power source lead 25. Terminal 172 of the mercury tube time delay relay connects to terminal 49 of rate-of-change relay 158, thence through contact 45 to terminal 194 and back to power source lead 26. Thus, when contacts 49 and 45 are shorted, or make contact, the brake coil 74 of time delay relay 180 is shorted, or de-energized. This releases a brake arm which instantaneously opens contact arm 69 and closes contact arm 70.

From the foregoing description, the operation of this voltage control circuit will be readily understood by those skilled in the art. Current flows from the source to terminal 25 of the power circuit through primary winding 97 via terminal 96 of the high voltage transformer 22, out through one of the taps 109 of tap switch 108, through movable arm 107 of the same switch, to movable arm 105 of variable resistor 103, through some portion of this resistance 106, out at terminal 102 of this resistor to terminal 101 of fixed resistor 100, out the remaining terminal 99 of this resistor through current transformer 93 and thence to the source of supply terminal 26. The secondary winding 195 of high voltage transformer 22 has 2 terminals. One of these, 111, is connected to a stator shoe 112, while the other terminal 113 is connected to stator shoe 114 of the mechanical rectifier which is assumed to be operated by means of a 4-pole synchronous motor. These two stator shoes, 112 and 114, are 180 mechanical degrees apart. One of the remaining stator shoes 115 is connected to ground 29. The last of the four stator shoes 117 is connected to discharge electrodes 118 of the precipitator. The collecting electrodes 116 of this precipitator are connected to ground 29. The two rotor shoes 119, attached to an insulated rotor, each occupy about 90 mechanical degrees on the periphery of the rotor. The conducting medium between stator and rotor is air.

As current flows through transformer 22, instrument current transformer 98 is energized, and current flows through current coil 58 of rate-of-change relay 158 and current coil 165 of current balance relay 135, through terminals 162, 161, 163, 164 and 166. Direct current is available at terminals 139 and 140 for supplying the regulator motor 122, 123 and 121 of current regulator 120.

Potential is applied to potential coil 57 of rate-of-change relay 158 from terminal 25 of the supply source to terminal 160 of the potential coil and from terminal 26 of the supply source to terminal 159 of potential coil 57.

Potential is applied to potential coil 174 of current balance relay 135 from terminal 25 of the supply source to terminal 175 of the potential coil and from supply source lead 26 to terminal 176 of potential coil 174.

Control current is applied to control current coil 177 of current balance relay 135 as follows: One terminal 178 of the control current coil connects directly to supply source lead 25, while the other terminal 179 connects to movable arm 181 of potentiometer 182 through movable contact 69 and fixed contact 66 and 67 of time delay relay 180. One end 184 of the potentiometer connects directly to power source lead 26, and the remaining terminal 185 connects to power source lead 25.

Motor 71 and brake coil 74 of time delay relay 180 are both energized as follows: One terminal 61 of the motor winding is connected to power source lead 26. The remaining terminal 63 and 64 is connected through contact 70 to terminal 65 and thence to power source lead 25. Brake coil 74 has two terminals 60 and 61, of which terminal 60 connects to one end 191 of resistor 192 and thence directly to power source lead 25. The other terminal 61 connects directly to power source lead 26. Brake coil 74 is then operated, as well as motor 71. Contact 69 is slowly closed, and as the closing takes place, contact 70 opens and de-energizes motor 71.

Assuming that the initial voltage applied to the precipitator is very low and that the control current potentiometer 182 has been manually set to an extremely high value, the current balance relay 135, acting through the regulator motor reversing switch 136, will cause regulator motor 122, 123, 121 of current regulator 120 to raise this voltage by reducing the amount of variable resistance 103 in the power circuit. After this resistance is all cut out of the circuit, tap-switch 108 operates, so that a higher voltage across the precipitator will be obtained with the same value of primary voltage. All of the resistance 103 is again placed in the power circuit by the continued rotation of arm 105 and the cycle is repeated until the current balance relay 135 has reached a balance between current passing through the current coil 165 and the current passing through the control current coil 177, inasmuch as these coils are connected so as to oppose each other.

The detailed operation of the voltage raise is as follows: Current coil 165 acts to reduce the precipitator voltage, while the control current coil 177 acts to raise this voltage. Thus, current coil 165 of current balance relay 135 tends to drive movable contact 132 toward fixed contact 133 which energizes operating coil 138 of the regulator motor reversing switch 136. When this part of the relay is energized, contact 147 is closed and connects terminal 123 and 121 of the reversible regulator motor to direct current leads 139 and 140. This drives the movable arm 105 of the variable resistor 103 in a direction that cuts in more resistance 106 and, if continued, causes transformer tap-switch 108 to increase the number of turns of primary winding 97 in the power circuit, thus further reducing the precipitator voltage. This cycle may be repeated.

Control current coil 177 tends to drive movable contact 132 of current balance relay 135 toward contact 134. When this contact is made, operating coil 137 of reversing switch 136 is energized. This operation closes movable contact 145 which places direct current from supply leads 139 and 140 across terminals 122 and 121 of the current regulator motor. The motor runs in a direction opposite to that above described, thus driving movable arm 105 of the variable resistor 103 in a direction to cut out resistance 106 and, if continued to the limit of the resistor 103, tap switch 108 is operated in such direction as to reduce the number of turns of the primary winding 97 in the power circuit, thus increasing the potential applied to the precipitator 118, 116 through the secondary winding 195 of the high voltage transformer 22 and the mechanical rectifier.

During the tap changing interval, the power supply is disconnected because the fixed taps 109 are placed farther apart than the width of movable arm 107, and also because during this interval movable arm 105 of the variable resistor 103 is caused to pass through an angular distance where no resistance taps are placed. During this specific interval, control switch 129 operates. Its fixed contact 131 is of such angular length as to span the interval of time required for tap-changing. Its movable arm 130 is positioned so as to make contact with the fixed contact 131 just before the power circuit is broken. Movable arm 130 is connected to power source lead 25. The fixed contact 131 connects to the mid-tap terminal 157 of motor reversing relay 136. This mid-tap terminal 157 connects to contact 155 through movable contact 148 and its attendant fixed contact 151 to one terminal 150 of operating coil 137 which coil causes the regulator motor to raise voltage. The other terminal 196 of operating coil 137 connects to power source lead 26 via mid-tap terminal 154. Terminal 157 also connects to fixed contact 156, through this to movable arm 149 and to terminal 153, which is connected to one end 152 of operating coil 138 of motor reversing relay 136. Coil 138, when energized, causes current regulator motor 122, 123, 121 to lower the precipitator voltage. The remaining terminal 197 of operating coil 138 connects to mid-tap terminal 154 and thence to power supply source lead 26. Assume that current regulator 120 is about to pass through a tap-changing operation; assume further that the voltage is being lowered, then current balance relay contacts 132 and 133 are closed, which energizes operating coil 138 of reversing relay 136. Contact 147 and contact 149 of this relay are then closed. As the power circuit is opened by the tap-changing operation, current balance relay contact 132 may also open as the current from the instrument current transformer 98 ceases. The regulator motor 122, 123 and 121 would stop except for the fact that control switch 129 has made contact and continues to maintain it until the tap-changing operation is completed. As contact 149 is closed (due to the previous operation of operating coil 138 through contacts 132 and 133 of the current balance relay 135), this operating coil is now energized as follows: From power source lead 25 through control switch arm 130 to fixed contact 131, to contact 156, through arm 149 to terminal 153, to terminal 152 of operating coil 138, and thence back to power supply lead 26. As soon as the tap changing operation is over, control switch 129 is opened, and the current balance relay 135 again takes control. During the tap changing operation in the raise voltage direction, contact 132 remains connected to fixed contact 134 of current balance relay 135 because the potential coil 174 is energized directly from source leads 25 and 26 and control current coil 177 is likewise energized directly from source leads 25 and 26 through potentiometer 182. Current coil 165 is de-energized during this operation inasmuch as the power circuit is opened by the transformer tap switch arm 107, thus de-energizing current transformer 98. However, in case contact 132 should open, the second pole, 151, 148, 155 of the two-pole reversing relay operated by coil 137 will remain closed, thus holding operating coil 137 in the energized position through the action of control switch 129 in the same manner as previously described for the other 2-pole reversing relay controlled by operating coil 138. The circuit connection is as follows: Power source lead 25 connects to movable arm 130 of control switch 129, through fixed terminal 131 to mid-tap lead 157, to contact 155, through movable contact 148 to fixed terminal 151, thence to operating coil terminal 150 of coil 137 and through this coil to terminal 196, then to mid-tap terminal 154 and thence back to power source lead 26. Through this circuit, operating coil 137 is kept energized during the tap changing operation. The reversible motor circuit is as follows: Direct current source lead 139 is connected to mid-tap terminal 141 of reversing relay 136, to contact 142 of one of the single-pole switches, through moving contact 145 to fixed terminal 144, thence to terminal 122 of the reversible motor and back through the motor, 122, 121 to the direct current source lead 140. The motor is thus driven in such direction as to cause the unidirectional voltage applied to the precipitator to raise.

The current permitted to pass through primary winding 97 of high voltage transformer 22 may then be kept essentially constant with time by means of current balance relay 135, the regulator reversing motor reversing switch 136 and current regulator 120, by manual adjustment of potentiometer 182 to any desired position.

By the inclusion of a rate-of-change relay 158 an auxiliary mercury tube time delay relay 127 and of a motor-driven time delay relay 180 with attendant fixed resistor 192, the constant current control circuit described in the foregoing becomes one in which the unidirectional potential across precipitator 118, 116 is continuously and automatically maintained at its snapping value.

These relays have been described and their operation is as follows: Rate of change relay 158 has two movable contacts 45 and 49 which are open when the potential applied to the potential coil 57 and the current coil 58 are constant or slightly varying. If current through current coil 58 changes abruptly, contact 45 strikes slower-moving contact 49 as previously explained. Contacts 45 and 49 are connected in series with mercury tube switch 171 of mercury tube time delay relay 127. Terminal 194 connects to contact 45 and to terminal 62, which is one side of brake coil 74 of motor driven time delay relay 180. The remaining terminal 60 of brake coil 74 connects to terminal 173, which is one terminal of mercury tube switch 171 of the mercury tube time delay relay. The remaining terminal 172 of this mercury tube time delay switch connects to terminal 49 of the rate of change relay 158. Terminal 49 connects to slow moving contacts 49. Thus, contacts 45 and 49 are connected in series with mercury tube switch 171 and then in parallel with brake coil 74. Brake coil 74 of motor driven time delay relay 180 is connected to the power source leads through a resistor 192. Source lead 25 connects to one terminal 193 of resistor 192. The remaining terminal 191 of resistor 192 connects to brake coil terminal 60 of motor driven time delay relay 180, and to terminal 173 of the mercury switch tube of mercury tube time delay relay 127. The remaining terminal 61 of brake coil 74 connects to source lead 26 and to terminal 194 of rate of change relay 158. When contacts 45 and 49 close, brake coil 74 is shorted, provided that mercury tube switch 173 is in its de-energized position. If the contacts of this mercury tube switch 171 are open, then the closing of contacts 45 and 49 has no effect on brake coil 74. Rate of change relay 158 is so designed that its contacts 45 and 49 close momentarily when the unidirectional potential across the precipitator 118 and 116 snaps. These snaps across the precipitator cause a sufficient change in the current passing through instrument current transformer 98 to abruptly change the value of the current passing through the current coil 58 of rate of change relay 158, thus causing a change in the position of contacts 45 and 49. As previously explained, contact 45 moves rapidly and contact 49 slowly with respect to a sudden change in current through current coil 58, and these contacts are so positioned with respect to each other that they make contact momentarily. When brake coil 74 of motor-driven time delay relay 180 is shorted by the closing of contacts 45 and 49, movable contact 69 of motor driven time delay relay 180 instantaneously opens and movable contact 70 closes. The control current applied to control current coil 177 of current balance relay 135 by means of potentiometer 182 must pass through contact 69 of motor driven time delay relay 180 as follows: Movable arm 181 of potentiometer 182 connects to terminal 67 of motor driven time delay relay 180, through contact 69 to terminal 66 thence to terminal 179 of the current balance relay 135. Terminal 179 connects to coil 177 and thence to terminal 178. Source lead 25 connects to terminal 178. Fixed terminal 184 of potentiometer resistor 183 connects directly to source lead 26, and the remaining fixed terminal 185 of potentiometer resistor 183 of potentiometer 182 connects to source lead 25. When contact 69 opens, contact 70 closes and energizes motor 71 of motor driven time delay relay 180. This circuit is from source lead 26 to terminal 61 of motor driven time delay 180, thence through motor field winding 71 to fixed contact 63 and 64, through movable contact 70 to terminal 65 and thence to source lead 25. Motor 71 through a speed reducer and a set of differential gears causes time delay contact 69 to close after a time interval, provided that brake coil 74 is energized. If brake coil 74 is continuously de-energized, contact 69 remains open even though motor 71 is energized. When contact 69 closes, contact 70 opens, thus opening the circuit of motor 71 and contacts 69 and 70 are held in this position as long as brake coil 74 is energized.

Thus, a snap across the precipitator 118, 116 causes removal of the control current through control current coil 177 of current balance relay 135. This current tends to drive movable arm 132 of the current balance relay against fixed contact 134 and to energize operating coil 137 of reversing switch 136, which in turn causes reversible motor leads 122, 121 to become energized so that current regulator 120 will move in a "raise-voltage" direction. Therefore, current regulator 120 cannot further increase the voltage, as the torque on the disc driving movable arm 132 in the "raise" direction is removed by the opening of contact 69. Contact 132 then tends to move toward contact 133, which is the lower voltage contact of the current balance relay, and if contact 69 of the motor driven time delay relay is open for a sufficient period of time, contacts 132 and 133 will make contact, and the high-tension voltage will be reduced. Therefore, if the setting of movable arm 181 of potentiometer 182 is so chosen that it would normally cause current balance relay 135 to raise the potential across precipitator 118, 116 to such a value as to cause a continuous power arc, then, inasmuch as the snapping voltage is reached before the arcing voltage, the current regulator 120 will always be attempting to reach the arcing voltage, but it will be prevented from doing so by the action of the snapping voltage. Accordingly, regulator 120 will continue to increase voltage until the snapping voltage is reached. If the snaps become too frequent, contact 69 will remain open and current balance relay 135 will cause current regulator 120 to slightly reduce the voltage. Thus, the timing of contact 69 of the motor driven time delay relay will control the setting of current regulator 120 so that the desired number of snaps per unit of time may be approximately selected.

To prevent false operation of brake coil 74 of motor driven time delay relay 180 through the action of contacts 45 and 49 of rate of change relay 158 during the time the tap switch arm 107 of tap switch 108 is opening and closing the power circuit, mercury tube time delay relay 127 and control switch 124 are provided. The opening and closing of the power circuit by switch arm 107 is equivalent to a series of snaps of the precipitator voltage as far as current coil 58 of rate of change relay 158 is concerned. Thus, contacts 45 and 49 make several contacts during this time interval. This is prevented from de-energizing brake coil 74 during the raise direction of rotation of current regulator 120 as follows: Just before movable arm 107 opens its circuit and before movable arm 105 of variable resistor 103 leaves contact 102, which is the beginning of variable resistor 106, movable arm 125 briefly contacts 126 of control switch 124 during the arms' rotation. This energizes operating coil 167, then as contact 125, 126 is broken, operating coil 167 of mercury tube time delay relay 127 is de-energized. The mercury tube switch 171 was first tipped through a large angle by the energizing of coil 167, then quickly returned to its original position. This action threw the mercury quickly away from its contacts 172 and 173 and then allowed the mercury to close these contacts after an elapsed time as the mercury in returning to its original position must pass through a small hole. This switch 171, then causes contacts 172 and 173 to open before the power circuit was opened, and to remain open until after the power circuit is again closed. Thus, even though the contacts 45 and 49 of the rate of change relay made several contacts during the switching interval, brake coil 74 of motor driven time delay relay 180 has not de-energized as the circuit of 45 and 49 to the brake coil was opened, as outlined in the foregoing. The energizing circuit of operating coil 167 of mercury tube time delay relay 127 is as follows: Source lead 26 connects to control switch arm 125 of control switch 124, through the fixed contact 126 to terminal 170 of operating coil 167 of mercury tube time delay relay 127 and the other end of coil 167 connects to terminal 169, which in turn connects to the source lead 25.

When the current regulator 120 travels in the "voltage lower" position, the current through coil 165 must exceed the current through control current coil 177. False operation of the rate of change relay 158 (contacts 45 and 49) are not then of importance, as removing the control current completely during tap-changing has the same effect as having it of less value than the current through coil 165 of the current balance relay. Thus, movable arm 125 of control switch 124 makes contact with fixed contact 126 after the tap-changing operation takes place when the current regulator 120 is moving in the "voltage lower" direction. Variable resistor 106 has been just all inserted in the circuit, then removed and the tap-switch changed to a lower value, while movable arm 105 of variable resistor 103 is again placed in the circuit, but on terminal 102, which is the beginning of this variable resistor 106. The only resistance in the circuit at this time is the fixed or ballast resistor 100. At this moment, the power circuit is unstable due to the little resistance in the primary circuit, and due to the relatively quick closing of contacts 102 and 105 and the simultaneous closing of switch arm 107 with one of the contacts of 109 of primary winding 97 of the high voltage transformer. A surge of potential across precipitator, 118, 116, may take place and, as there is little resistance in the primary circuit, a power arc may result. However, as movable arm 105 contacts 102 of variable resistor 103, movable arm 125 contacts fixed contact 126 which, as previously described, operates mercury switch 171. Thus, a snap across the precipitator at this time cannot affect current balance relay 135 as previously outlined, so that regulator motor 123, 121 continues to move in a "voltage lower" direction. After time delay mercury switch 171 is again in its normal operating position, the rate-of-change relay 158 again takes control, through current balance relay 135.

Potentiometer 182 may be normally set so that a snapping voltage continuously exists across the precipitator 118, 116. However, this setting is such that if a power arc should occur in the precipitator, the current regulator would rapidly decrease its setting, and if continued, breaks the power circuit through movable arm 107 of the tap switch 108 and then connects the precipitator to a lower voltage setting. This may be continued until the transformer primary 97 is completely disconnected from the power source. Ordinarily this complete operation, in case of a short in the precipitator, may require one minute.

Figure 12:
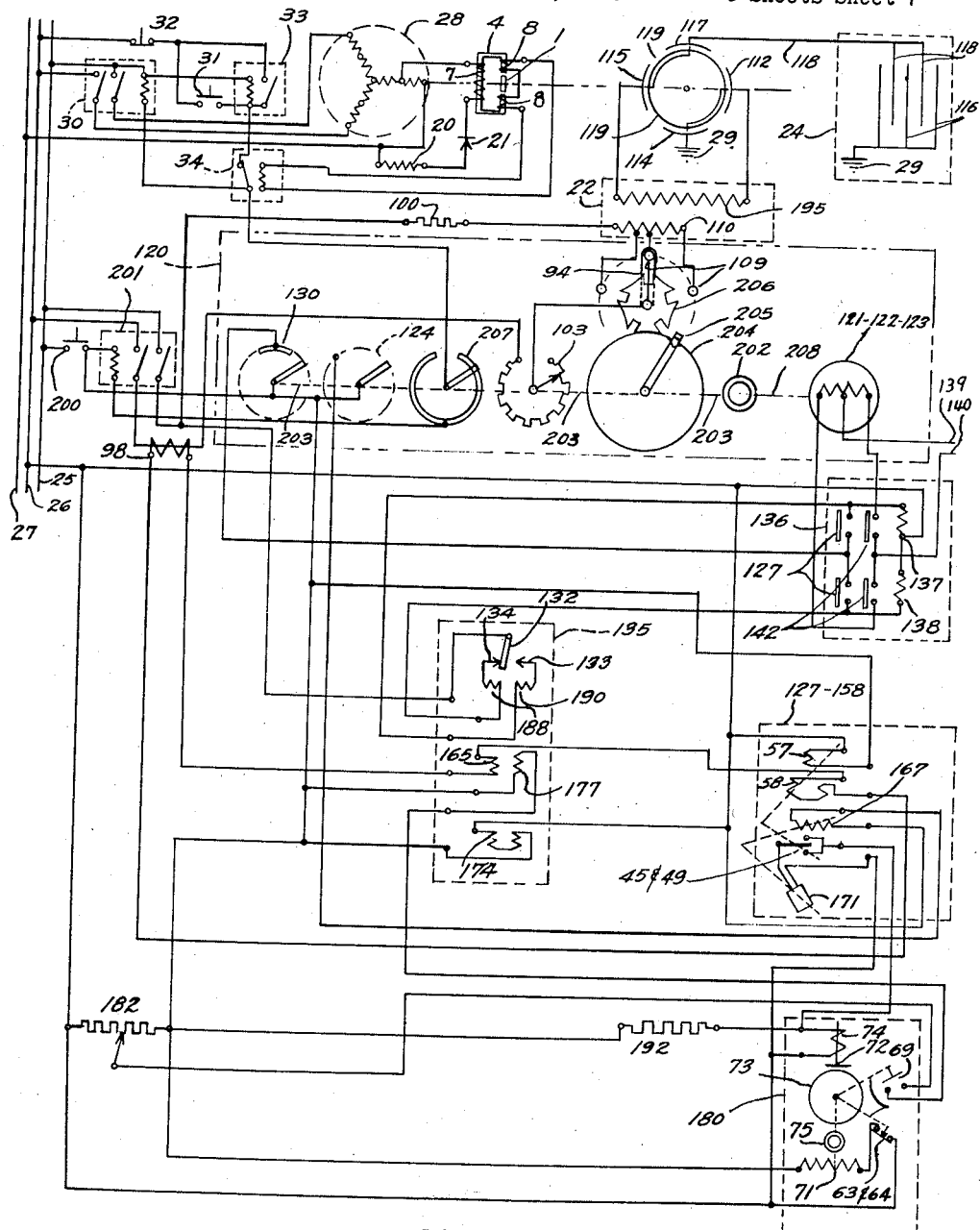
Fig. 12 illustrates a general diagrammatic view of a complete electrical precipitator installation embodying the present invention.

Referring now to Fig. 12 of the drawings the general lay-out of a complete electrical precipitator installation is illustrated. Reference characters 25, 26 and 27 denote an available 3-phase power line. 32 is a momentary type push button, one side of which is connected to lead 26 and the other side connected to a contact on magnetic switch 33 and to one contact of a momentary close type push button 31. The purpose of push button 32 is to stop the rectifier motor 28 and to also disconnect the high voltage transformer 22 from the precipitator 24 and power leads 25 and 26. Reference character 30 denotes a magnetic motor-starter switch. In the diagram of Fig. 12, power lead 27 is connected directly to one phase of the 3-phase rectifier motor 28; leads 26 and 25 are connected to the remaining 2 phases of the rectifier motor 28 through the magnetic starter switch 30. One terminal of the operating coil of this magnetic switch 30 is directly connected to lead 25 of the power supply. The other terminal of the operating coil is connected to one terminal of a magnetic switch 34. 34 is a single pole magnetic relay, shown in a closed position. The second terminal of this single pole relay, 34, is connected to the remaining contact of push-button 31, to one terminal of the operating coil of magnetic switch 30, and also to the remaining pole of the single pole auxiliary relay 33. This single pole magnetic switch 33 is shown in an open position. The remaining terminal of the operating coil of magnetic switch 33 is connected directly to power leads 25. The three-phase rectifier motor 28 may then be started by momentarily closing push-button 31; current flows from power leads 26, through the closed contacts of push button 32, through the contacts of push button 31, through the operating coil of auxiliary relay 33, and back to lead 25 of the power line, thus completing the circuit, and causing the previously open single pole magnetic switch 33 to close its contacts. Power lead 25 is also connected to the operating coil of the motor starter switch 30, so that current will flow from lead 25, through the operating coil of 30, through the closed single pole switch 34, through the now closed contact of single pole switch 33 and back to power lead 26 through the closed contacts of push-button 32. The momentary-close push button 31 may then be released, and the rectifier motor 28 will come up to speed.

As soon as the two pole motor starter switch closes its contacts, all 3 phases of the power line are applied to the rectifier motor 28. This operation likewise applies potential to stator winding 7 of the polarity selector device, from lead 27 of the power supply, through resistor 20 and half-wave rectifier 21, through winding 7 of the polarity device, and thence to a low-voltage tap on the 3-phase rectifier motor field winding. Full voltage could be applied to winding 7, but it is more economical to use a reduced voltage tap. The rectifier motor 28 runs as a 4 pole synchronous motor. On one end of its shaft is directly connected an iron rotor 1. An iron stator 4, is placed adjacent to rotor 1. Around this iron stator 4 is wound a coil 7, and, in close proximity to the iron rotor 1, are wound two coils 8. Thus, three coils in all are wound on the iron stator, and none on the iron rotor. The two coils 8 are connected in series and thence connected directly to the operating coil of magnetic switch 34. The rotor of the mechanical rectifier 199 is also directly attached to one end of the rectifier motor 28. Thus the iron rotor 1 and the mechanical rectifier rotor 199 will have a definite mechanical position relationship at all times.

The iron rotor 1 may be so positioned that the air-gap between it and the stator 4 will be a minimum at the moment current is permitted to flow through stator winding 7 by half-wave rectifier 21. A voltage is thus induced in windings 8 which in turn will cause current to flow through the operating coil of the relay 34. Relay 34 is adjusted so that this value of current will actuate its single pole contact. If the rectifier motor 28 comes up to synchronous speed with the polarity device rotor 1 in the relationship above outlined, the relay 34 operates, thus opening the circuit of the operating coil of the rectifier motor starter 30. This removes the potential from coil 7 of the polarity device, which in turn removes the actuating current from the operating coil of relay 34, allowing this relay to reclose its contacts. When these contacts close, the rectifier motor starter switch 30 is again energized, and the rectifier motor 28 is again placed in the running position. Then coil 7 of the polarity device is again energized and the cycle may be repeated. The rectifier motor 28 may also come up to synchronous speed with the iron rotor 90 mechanical degrees displaced from the condition as outlined. In this case a very large air gap synchronously exists between rotor 1 and stator 4 of the polarity device. In this case, the half-wave rectifier 21 allows current to flow when the air gap is very large, and when this air gap reaches its minimum position, no current can pass through this half-wave rectifier. When current does flow, very little potential is induced in windings 8 by means of coil 7 and iron circuits 4 and 1 because of the large air gap. The magnetic flux in 4 due to the current through coil 7 is mostly lost through leakage. Thus, the potential that appears across the operating coil of relay 34, due to coils 8, may, in the first illustration be three times what it would be if the rectifier motor 28 came up to synchronous speed in the position just described.

The rectifier motor 28 being a 4-pole synchronous machine, there will be 2 different positions in which it may synchronously rotate, with relation to the mechanical rectifier rotor 199 and stator shoes 112, 114, 115, 117. One stator shoe, 117 of this mechanical rectifier is permanently connected to the discharge wires 118 of the precipitator 24. It is normally desirable to maintain these discharge wires negatively charged. Inasmuch as the high voltage transformer secondary 195 has its terminals permanently connected to two opposite stator shoes, 112, 117 of the mechanical rectifier, and as the primary winding of this transformer 110 is connected to the same power source as that which drives the rectifier motor 28 and the mechanical rectifier as well as the rotor 1 of the polarity device, it will be obvious that once the mechanical rectifier rotor 199 is adjusted on the rectifier motor shaft, there will be only two synchronous positions of the rotor 199 with respect to the stator shoes that will give proper polarity and 2 positions that will give wrong polarity. The two correct positions are 180 mechanical degrees apart, and the two wrong positions are 180 mechanical degrees apart. If the rectifier motor 28 comes up to speed with the rotor 199 in the wrong position, that is, causes the discharge wires 118 of the precipitator 24 to become charged positively, then this could be corrected by causing the rotor 199 to drop back 90 mechanical degrees, or the equivalent of one pole distance on the rotor of rectifier motor 28. If it dropped two poles, or any even number of poles, the polarity of the discharge wires 118 would still be wrong, whereas any odd number of poles that the rectifier motor 28 drops back would correct the wrong polarity.

The control circuit described in the foregoing is designed for the purpose of causing the rectifier motor 28 to maintain at all times the proper polarity of discharge wires 118. If the rectifier motor 28 comes up to speed so that the polarity is correct, the operating coil of relay 34 will not function because the applied voltage is too low. If the polarity is wrong, the operating coil of relay 34 functions. The rectifier motor 28 is disconnected from the power supply 27, 26, and 25 and slows down; this automatically removes the actuating current through operating coil of relay 34, which causes the motor starter 30 to reclose, thus placing the rectifier motor again on the line. Relay 34 is so adjusted as to operating time that the reclosing occurs in time to allow the motor 28 to drop back one pole (or an odd number) of poles, with respect to its synchronous position. The same sequence of operations would take place if the rectifier motor 28 should accidentally drop back one or an odd number of poles during proper operation. The purpose of resistor 20 is to prevent too large a current flowing through stator winding coil 7. Reference character 29 denotes a ground; 116 denotes the collecting or large surface electrodes of the precipitator 24, while 118 indicates the fine wire, or discharge electrodes.

The voltage control device comprises the following parts: Transformer start and stop maintaining contact push button, 200; 2-pole magnetic switch 201, for energizing a high voltage transformer 22; fixed resistor 100, connected in series with the primary of the transformer 22; a current regulator 120, consisting of a reversing motor 121, 122, 123, a speed reducer 202 and a slow speed shaft 203 directly connected to a Geneva-motion gear 204, 205, 206 carrying switch arm 107 which connects to transformer taps 109, a slow speed shaft 203 directly connected to variable resistor tap switch 103 and to separate relay control arm of control switches 130, 124 and 207; and a variable resistor 103, which is a part of the current regulator 120, connected in series with the primary 110 of transformer 22 varied by means of a reversing motor 121, 122, 123 through speed reducer 202. Motor 121, 122, 123 is operated by means of a magnetic reversing switch 136, which in turn is controlled automatically by a current balance relay 135. The primary 110 of the high-voltage transformer 22 has reduced voltage taps 109; a tap switch 94, driven through a Geneva-motion gear 204 and 206, automatically changes the tap switch arm 94. Geneva motion gear 204, 205 and 206 is driven by the reversing motor 121, 122, 123 through speed reducer 202, and is connected to the same slow speed shaft 203 as variable resistor 103. Motor reversing switch 136 consists of two 2-pole magnetically operated switches.

Current balance relay 135 operates upon the principles of a watt-meter; it has a normal current coil 165 and a potential coil 174 and in addition a second current coil 177 which is designed to oppose the action of the first current coil. The opposing force of this second current coil 177 may be manually adjusted by a potentiometer 182. The contacts of current balance relay 135 consist of 2 stationary contacts 133 and 134, and one movable reversing arm 132. This arm 132 is attached to the rotating and reversing disc of the watt-meter-type relay 135 through a spring. The spring is so adjusted that arm 132 makes contact with stationary contact 134 when the relay 135 is de-energized. This position of the contacts 134 and 132 is such as to cause the reversing relay 136 to drive the regulator motor 121, 122, 123 in such direction as to cut out the variable resistor 103, thus increasing the potential applied to the primary 110 of the high voltage transformer 22. Magnetic holding coils 188 and 190 are built into this current balance relay 135 in order to prevent the contacts 133, 134 and 132 from chattering when they are engaged. Rate of change relay 127 and 158 is similar in construction to the current balance relay 135 and operates on the principle of a wattmeter. It has a current coil 58 and a potential coil 57. The moving disc carries a contact arm 45, and also through a spring and separate bearings, a large mass frame is mounted therein carrying two contacts. The disc is light in weight and may move rapidly, carrying contact arm 45 with it. The large frame carrying its contacts has a great inertia and cannot move rapidly. Sudden changes in current through the current coil 58 cause the lightweight disc and arm to strike the heavier frame and contacts whereas gradual changes in current allow the two members to move at the same rate of speed without making contact. In the same case 127 and 158 with the rate of change relay is mounted a time delay relay 167, 171. This relay consists of a solenoid 167 and a time delay mercury tube switch 171. When the solenoid is energized the mercury in the tube 171 is thrown to the upper end of the tube over a splash plate, but when the solenoid is de-energized, the mercury must regain its former position by flowing through an aperture in the splash plate. The contacts in this lower end of the tube are so positioned that a definite time elapses from the time the solenoid is de-energized until a sufficient quantity of mercury has entered this part of the chamber to close said contacts. Thus, relay 167, 171 is of the quick open and time delay close type which is closed when in the de-energized position.

Reference character 180 denotes a time-delay relay, driven by an unidirectional motor 71 through speed reducer and differential gears 82, 85, 84, 91. The relay opens one set of contacts 69 and closes one set of contacts 63 and 64 when the magnetic brake 74 and 72 is deenergized. This operation is instantaneous. The motor 71 then operates through closing action of contacts 63 and 64, but contact-carrying arm 68 cannot move until the brake coil 74 and brake shoe 72 are energized, because of differential gears 75, and a restraining spring. When brake 74, 72 is energized, drum 73 is held stationary, and contact arm 68 advances clockwise at a rate of speed depending upon the motor speed and gear reduction (75 and 71). When contact arm 68 closes contacts 69, it also opens contacts 63 and 64, which de-energize motor 71. As long as brake 74, 72 is energized, the relay 180 maintains this position. A resistor 192 is connected in series with the brake coil 74, thus allowing the brake coil 74 to be short-circuited without an excess of current flow through the shorting medium. A current transformer 98 is provided to energize the current coil 165 of the current balance relay 135 and the current coil 58 of the rate-of-change relay 127, 158. These three units are connected in series.

The power circuit for supplying the high voltage transformer primary 110 is connected to the power supply leads 26 and 25, through the 2-pole magnetic switch 201, fixed resistor 100 connected to lead 25 on the transformer side of the magnetic-switch 201, and lead 26 connected to the opposite transformer primary lead through variable resistor 103 and Geneva-motion switch tap arm 94. Tap-switch 109, 94 provides relatively large changes of potential across the high-voltage transformer secondary 195, whereas the variable resistor 103 provides continuous small changes of this secondary voltage. Fixed resistor 100 is used to prevent sudden abnormal changes in the unidirectional potential applied to the precipitator 24 through the action of the mechanical rectifier 119. The transformer 22 cannot be energized until the rectifier motor 28 is energized. This is accomplished by connecting the start push button 200 of this power circuit to lead 25, thence through the push-button 200, through the operating coil of the magnetic switch 201, through an auxiliary disconnect switch 207, connected to the slow speed shaft of the regulator 120, and then to lead 26 of the power supply through auxiliary relay 33 and polarity device relay 34 of the rectifier motor (20) circuit. Push-button 200 is of the maintaining contact type. The 2-pole magnetic switch, 201, used to energize the high voltage transformer 22 is so arranged that its contacts are open when the switch is de-energized. An instrument type current transformer 96 is connected to lead 26 of the power supply circuit, on the transformer (22) side of the line, so it will be de-energized when the switch 201 is de-energized.

Current regulator 120 consists of seven parts (1) a direct current reversible motor, 121, 122, 123; (2) a speed reducer 202; (3) a slow speed shaft of this speed reducer directly connected to a Geneva-motion gear 204, 205 and attendant reduced voltage tap switch 109 and 94; (4) a variable resistor 103, the movable arm of which is directly connected to the slow-speed shaft; (5) to disconnect switch 207, with its movable arm also directly connected to the slow speed shaft; (6) time delay contact making relay switch 124 with its movable arm also directly connected to the slow speed shaft; (7) pickup contactor 130 of the regulator motor 121, 122, 123, reversing switch 136 having its movable arm connected to the slow speed shaft. The mechanical arrangement of each of the above movable arms is such as to be adjustable with respect to each other. This is essential for proper sequence of the operations they are to perform.

The purpose of these seven parts is the following: The reversing motor 121, 122, 123 is required to drive the remaining elements previously described, in order to raise or lower the unidirectional potential applied to the precipitator 24, through the action of transformer 22 and the mechanical rectifier 119. The speed reducer 202, connected to the motor shaft 208 and to the slow speed shaft 203 is required for proper timing of operations. The Geneva-motion 204, 205 and 206 is required in order to allow the variable resistor 103 to run through its complete range before the tap switch arm 94, driven by the Geneva motion gears makes a large change in the potential of the secondary winding of transformer 194 by changing taps 109 in the primary circuit, 110, of the power transformer 22. As soon as the tap changing is accomplished, the variable resistor 103 is again ready to continue its previous operation of raising or lowering the unidirectional potential applied to the precipitator 24, inasmuch as the mechanical motion of the switch arm of variable resistor 103 is rotary and during that part of the angular motion which is required to change transformer taps 109, by means of Geneva motion gears 204, 205 and 206, the switch arm of variable resistor 103 moves from one limiting end of the variable resistor 103 to the opposite end. As an example, the variable resistor 103 may be assumed to be just cut completely out of the power circuit. As the movable arm reaches the last tap of resistor 103, the Geneva motion gear operating arm 204 engages the toothed gear of 206 causing the tap switch arm 94 to engage another tap 109 of the voltage taps of primary transformer winding 110. As soon as the operating arm 205 of the Geneva motion gear 204, 205 and 206 has performed this operation, the tap switch arm 94 remains stationary, but the movable arm of the variable resistor 103 continues to revolve, thus contacting the opposite end of resistor 103 which places all of it in the power circuit. Thus, the Geneva motion tap switch 109 and 94 acts as a coarse voltage adjusting switch, while the variable resistor 103 acts as a vernier on this voltage adjustment. During this tap changing operation the movable switch arm of switch 207 passed through that portion of its revolution during which it made no contact, the angular distance being the same as the open-circuit portion of the variable resistor 103. The movable arm of this switch is connected to power supply line 26 through polarity device relay 34 and auxiliary relay 33. The fixed contact surface of 207 is connected to one end of the operating coil of the transformer magnetic switch 201, and then through the start push button 200 to power supply lead 25. When this circuit is broken, which occurs while tap changing is being accomplished, the transformer 22 is disconnected from its source because relay 201 is de-energized. As soon as the tap changing has been accomplished, the movable arm 207 again contacts the fixed surface of 207 and the transformer 22 is again energized because relay 201 is again energized. The purpose of switch 207 is then to disconnect power transformer 22 from the power supply leads 26 and 25 during the time required to change voltage taps 109, which is likewise the period of time required for the variable resistor arm of 103 to travel from one end of the resistance to the other. The time delay contact making switch 124 has a movable arm connected to power supply lead 25 through the push button 200. It has a fixed contact which is connected to one terminal of the operating coil of the mercury tube time delay relay 167 and 171. The other terminal of the operating coil 167 is connected directly to power supply lead 26. The purpose of switch 124 is to cause the mercury tube time delay 167, 171 to function just before all the variable resistance 103 is cut out of the circuit. The fixed contact and movable arm of 124 are then properly positioned with respect to the movable arm of 103.

The regulator motor reversing switch pickup switch 130 has its movable arm connected to movable arm of 124. The fixed portion of this switch 130 occupies an angular position sufficient to cover that portion of travel of the movable arm of variable resistor 103 during which the circuit is open; that is, during the tap changing (109, 94) operation. The fixed contact of 130 is connected to the mid-tap 127 of one pole of each of the relays composing the regulator motor reversing switch 136, through these contacts to their respective operating coils 137 and 138. The other terminals of these operating coils 137 and 138 are connected together and to power lead 26. The contacts 127 of reversing switch 136 are closed when the relays 136 are energized. Thus, the purpose of switch 130 is to cause the regulator 120 to operate during the tap-changing operation. Normally the current balance relay contacts 133, 134 and 132 control the regulator motor 121, 122, 123, but these contacts are de-energized during the time the tap-changing operation takes place, and switch 130 assumes control at this time.

From the foregoing description, the operation of the complete circuit will be readily understood by those skilled in the art. Assuming that the rectifier motor 28 is operating as previously described, then transformer 22 may be energized. This is accomplished by closing push button 200. Potential is then applied to potentiometer 182, one fixed terminal of which is connected directly to power supply lead 26, the other fixed terminal to power lead 25 through push button 200. The movable arm of this potentiometer is connected to one fixed contact of time delay relay 180, which is closed by means of arm 69, thence to the control current coil 177 of the current balance relay and back to power supply lead 25 through push button 200. Potential has also been applied to motor 71 of time delay relay 180 from supply power lead 25 through push button 200, through motor winding 71, through the closed contacts 63, 64 of time delay relay 180, and thence directly to supply power lead 26. Brake coil 74 of this time delay relay 180 is now also energized from power supply lead 25, through push button 200, through resistor 192 connected in series with the brake coil, and through the brake coil 74 back directly to power supply lead 26. When motor 71 and brake coil 74 are both energized, brake 72 holds drum 73 stationary and thereby causes contact arms 68 to rotate toward their fixed contacts 69 and 63, 64. This is in a clockwise direction as viewed in Fig. 12. When contact arms 68 make contact, 63, 64 opens and 69 closes. 63, 64 opens the circuit of motor 71, thus stopping the motor, while 69, being now closed, allows current to flow in the control current winding 177 of the current balance relay 135. Potential has also been applied to the potential coil 174 of the current balance relay 135 from supply power lead 25, through push button 200, through potential coil 174 back to power supply lead 26. Potential has also been applied to the potential coil 57 of the rate-of-change relay 127, 158, its two terminals being connected directly in parallel with the potential coil 174 of the current balance relay 135.

Reference characters 139, 140 denote a source of direct current, one terminal of which is directly connected to the mid-tap of the regulator motor 121, 122, 123, and the other direct current lead is connected to the mid-tap of the remaining single pole contacts 142 of the two pole, open when de-energized reversing switch 136. One outside contact of this reversing switch 136 is connected directly to one side of motor 121, 122, 123, to enable the motor to operate in one direction, while the other contact of the reversing switch 136 is connected to the remaining terminal of the reversible direct-current motor 121, 122, 123 in order to drive it in a direction opposite to the above direction. Operating coils 137 and 138 of this reversing relay are energized from the alternating supply leads 26 and 25. Instrument current transformer 98 is connected in series with current coil 58 of the rate of change relay 127, 158 and with the remaining current coil 165 of current balance relay 135. When properly connected, the current through coil 165 opposes that through coil 177 of current balance relay 135. Current coil 165 (and potential coil 174) produce a torque on the movable disc carrying contact arm 132 tending to drive it toward fixed contact 133, which, if contacted, energizes operating coil 137 of reversing relay 136, thus driving the regulator motor 121, 122, 123 in such direction as to increase the amount of resistance 103 in the primary 110 of high voltage transformer 22. During this operation, current flows from the supply source lead 25, through one contact of the transformer magnetic switch 201 to movable contact 132 of the current balance relay 135, through contact 133 and magnetizing coil 188, 190 to operating coil 137 of one side of the reversing switch 136, thence directly back to power supply lead 26. Control current coil 177 and potential coil 174 produce a torque on the movable disc carrying contact arm 132 tending to drive it toward fixed contact 134. The torque is enhanced by a spring attached to the frame of relay 135 and to movable arm 132, so that in a de-energized position movable contact 132 makes contact with fixed contact 134. When 134 and 132 are closed, regulator motor 121, 122, 123 is driven in such direction as to cut out variable resistance 103, thus increasing the potential applied to the precipitator 24 as follows: Current flows from power supply lead 25, through one contact of magnetic switch 201 to movable arm 132, through contact 134 and magnetizing coil 188, 190 to one terminal of operating coil 138 of the reversing switch 136, thence directly back to power supply lead 26. Direct current then flows from one side of 139, 140 through the now closed contact 142 operated by coil 138 to one outside terminal on motor 121, 122, 123, which drives this regulator motor in a direction such as to increase the potential applied to precipitator 24. When currents through coils 165 and 177 are approximately the same, moving contact 132 will remain in a neutral position making no contact; approximately the same, because the added spring tension referred to in the foregoing makes it necessary for the current transformer 98 to provide a greater torque than that required by the potentiometer 182 to current coil 177 for a true balance. Assuming that a very low value of unidirectional potential was initially applied to precipitator 24 by means of transformer 22 and mechanical rectifier 119, then the variable resistance 103 may be cut out of the circuit completely, yet this unidirectional potential may still not be high enough for maximum efficiency. The Geneva-motion gears 204, 205 and 206 then change the primary transformer tap 109 to a higher one, and as all the resistance 103 is now back in the circuit, the cycle is repeated until such time as a snapping voltage is attained across the precipitator, between electrodes 118 and 116. Let it be assumed that the potentiometer 182 has been manually adjusted to such a value that would cause an arc-over in the precipitator 24. Then current regulator 120 will continue to increase the potential applied to the precipitator 24 until a snap, or series of snaps occurs in the precipitator. These snaps affect the primary winding 110 of the high voltage transformer 22 and cause a sudden change in current which is indicated by current transformer 98. This in turn produces a sudden change in torque on the disc of the rate of change relay 127 and 158, through its current coil 58, and potential coil 57. This change in torque causes the contacts 45 and 49 to close momentarily. The circuit thus affected is the brake coil 74 of the time delay relay 180. One side of the brake coil connects to one terminal of series resistor 192 and to one side of contacts 45 and 49 of rate of change relay 127 and 158. The other side of the brake coil connects to the other terminal of 45 and 49. When contacts 45 and 49 close, brake coil 74 is short-circuited, which releases brake 72. This instantaneously opens contacts 69 and closes contacts 63 and 64 of relay 180 by the counterclockwise motion of drum 73 and of attached moving contacts 68. Contacts 63 and 64 being now closed, relay motor 71 is energized. If successive snaps of sufficient rapidity occur in precipitator 24, arm 68 will be unable to close its fixed contacts 69 or to open its closed motor contacts 63 and 64. While contacts 69 are open, the control current from potentiometer 182 is removed from control current coil 177 of current balance relay 135.

This control current tended to cause regulator 120 to increase the unidirectional potential applied to precipitator 24. Its removal causes the regulator to stop by opening contacts 134, 132 of current balance relay 135. If the snaps in the precipitator 24 occur too frequently, time delay relay 180 remains in a de-energized position, so that the control current coil 177 of current balance relay 135 is continuously removed. Then current coil 165 is energized through the action of current transformer 96 and provides sufficient torque to the disc and its attached movable arm 182 to cause it to contact 133, which in turn reverses the direction of rotation of motor 121, 122, 123 through operating coil 137 of the regulator motor reversing relay 136. This operation increases the amount of resistance 103 in the primary circuit of transformer 22, and, if continued, the Geneva motion gears 204, 205, 206 cause the tap switch 109 and 94 to change its setting to a lower value. The circuit just described is thus capable of maintaining a snapping voltage across precipitator 24, provided the potentiometer 182 is set at a sufficiently high value. If it is set at a value that proves to be below the snapping voltage, then the current balance relay 135 alone controls the above described circuit. The rate of change relay 127 and 158 controls the circuit only at the snapping voltage, with the following exception: When tap switch 109 and 94 is operated, magnetic switch 201 supplying transformer 22 with energy is de-energized. The rate of change relay current coil 58 is thus deprived of its energy and consequently its contacts 45 and 49 close during the operation. However, at this time, the closing of these contacts 45 and 49 is prevented from shorting the brake coil 74 of the time delay relay 180 by the action of the mercury tube time delay relay 167 and 171. In the voltage increase direction of travel of variable resistor 103, switch 124 is so positioned that its fixed contact is met by the movable arm just as the magnetic switch 201 is being opened. When this contact is made, operating coil 167 is energized for a short period, then de-energized as the movable arm of 124 passes its fixed contact. As contacts 45 and 49 and 171 are in series, brake coil 74 is not shorted, because switch 171 is a time delay mercury tube switch, capable of instantaneously opening the circuit, and having a time delay on closing. Its closing time is so selected that the rate of change relay 57, 58, 45 and 49 is allowed to come to rest in its new position after the magnetic switch 201 is again energized and the tap switch 109, 94 has assumed its new position before the contacts of 171 are closed. Thus mercury tube switch relay 167, 171, prevents false operation of the time delay relay 180. In the voltage decrease direction, the brake coil 74 of time delay relay 180 is permitted to be de-energized by the action of the rate of change relay contacts 45 and 49, as the mercury tube time delay relay 167, 171 is not energized until after tap switch 109, 94 has assumed its new position. Then the contacts of switch 124 close momentarily which energizes, then de-energizes mercury tube switch 171. This action prevents the regulator motor 121, 122, 123 stopping the movable arm of variable resistor 103 in a position that would leave very little resistance in the primary circuit 110 of the power transformer 22. This is because the control current has been removed from control current coil 177 by the action of time delay relay 180. This control current is re-established after the brake coil 74 has been energized, the brake arm holding drum 73 being stationary so that movable contacts 68 may be closed by the action of the motor 71, through speed reducer and differential gears 75.

The time required for this closing of contacts 69 may be varied by motor speed and internal adjustments of the relay. While the regulator 120 is changing taps 109, 94, the transformer magnetic switch 201 is de-energized as already explained. During this transitional period, the current balance relay contacts 133, 134, 132 are de-energized. In this case, regulator motor 121, 122, 123 would stop and there would be no automatic means of starting it again. Switch 130, already described, is used to prevent this stoppage. As the tap changing moment is reached, the movable contact arm of switch 130 comes in contact with its fixed member, and continues to slide along this fixed contact until magnetic switch 201 is again energized after the tap-changing has taken place. As it has been described in the foregoing, switch 130, driven by the same slow speed shaft 203 that drives the Geneva-motion gears 204, 205 and 206 and its attendant tap-changing switch arm 94 has its movable arm connected to power supply lead 25 through push button 200. The fixed contact of 130 is connected to one pole 127, of each of the switches composing reversing relay 136. The other contact of each of these poles of the two 2-pole switches composing the reversing relay is connected to its own operating coil, one to 137 and one to 138. The remaining terminals of these operating coils 137 and 138 are connected together and thence directly to the power supply lead 26. During operation, assuming operating coil 137 is energized through the closing of contacts 133 and 132 of current balance relay 135, and further assuming that the tap-changing position was just reached, switch 130 makes contact and, even though current balance relay contacts 133, 132 are de-energized, current will flow from power supply lead 26 through operating coil 137 of reversing switch 136, thence through one of its single pole contacts 127 through the now closed contacts of switch 130, through push button 200 and back to power supply lead 25. Thus, operating coil 137 remains energized during the tap changing period which in turn means that regulator motor 121, 122, 123 continues to operate through this period. As soon as the movable arm of 130 passes its fixed contact, operating coil 137 of the reversing relay will be de-energized from this source. However, the magnetic switch 201 of the transformer 22 supply circuit is again connected, through the action of switch 207, as previously described, so that current balance relay contacts 133, 134, and 132 again take control of reversing switch 136.

It will be noted that the automatic voltage control device for electrical precipitators provides a number of important advantages. Thus, my improved control device makes it possible to operate an electrical precipitator installation at maximum efficiency at all times.

It is also to be observed that the electrical precipitator system employing my automatic voltage control device is completely automatic in its operation and does not require any manual control at any time. Of course, this makes possible to effect considerable saving in labor cost and in operating cost. This is especially accentuated by the fact that, as a rule, electrical precipitators are operated 24 hours a day year in and year out. Therefore, the saving in power and the increase in material precipitated greatly increases the over-all efficiency of the plant.

Furthermore, it will be readily observed that my automatic control device is very simple in construction, is positive, reliable and fool-proof in operation and may be readily added to existing conventional and manually controlled installations at a relatively low cost.

Although the present invention has been described in connection with a preferred embodiment thereof, variations and modifications may be resorted to by those skilled in the art without departing from the principles of the present invention. Thus, any automatic or semi-automatic control system, such as, for example, the Pestarini direct current motor, the operation of which depends upon some action which may take place in the circuit due to the snapping of the unidirectional potential across the electrodes of an electrical precipitator, may be employed with equal or similar results. Generally speaking, the precipitator may be considered as a condenser which is charged by means of some unidirectional source. If due to a snap the quantity of energy stored in this condenser is changed, then this change may be employed to energize a control circuit of suitable character. It is also possible to employ a photoelectric cell which is affected by some action of the snapping voltage such as a particular color or wave length of the discharge accompanying the snap, or the movement of some meter needle. A radio receiver may be employed responsive to the oscillations of predetermined frequency set up by the snapping voltage. The snaps being of an audible character, it is also possible to employ an audio-frequency device responsive to these specific frequencies for actuating the control circuits embodying the invention. I consider all of these variations and modifications as within the true spirit and scope of the present invention as disclosed in the foregoing description and defined in the appended claims.

I claim:

1. A control device for an electrical precipitator device having a set of electrodes charged to a high unidirectional potential and adapted to cause the ionization and the precipitation of suspended particles from gases passed through the region of said electrodes comprising in combination a source of alternating current, a step-up transformer having a tapped primary winding, an adjustable resistance connected in series with said source of current and with said primary winding, rotary means for sequentially adjusting said resistance and the taps of said primary winding, reversible driving means for said rotary means adapted when actuated to vary the high alternating voltage across the secondary winding of said transformer, rectifying means connected to said secondary winding adapted to maintain high unidirectional potential on said electrodes, surge-actuated means responsive to sudden changes of current flow in the primary circuit of said transformer for actuating said reversible driving means in the "raise-voltage" direction when such surges occur less frequently than a predetermined time interval between surges and in the "lower-voltage" direction when such surges occur more frequently than a predetermined time interval, and means for disabling said surge-actuated means during tap-changing intervals.

2. A control device for an electrical precipitator device having a set of electrodes charged to a high unidirectional potential and adapted to cause the ionization and the precipitation of suspended particles from gases passed through the region of said electrodes comprising in combination a source of alternating current, a step-up transformer having a tapped primary winding, an adjustable resistance connected in series with said source of current and with said primary winding, rotary means for sequentially adjusting said resistance and the taps of said primary winding, a reversible motor for driving said rotary means adapted when energized to vary the high alternating voltage across the secondary winding of said transformer, rectifying means connected to said secondary winding adapted to maintain high unidirectional potential on said electrodes, a reversing relay for controlling the operation of said motor, current balance means responsive to all changes of current in the primary circuit of said transformer and adapted to actuate said reversing relay and said motor in the "raise-voltage" direction when said current is below a predetermined value and in the "lower-voltage" direction when such current is above said value, surge-actuated means responsive to sudden changes of current flow in said primary circuit to condition the operation of said current balance means and to maintain the secondary voltage substantially at the snapping value, and means for maintaining said reversing relay in the same position and for disabling said surge-actuated means during tap-changing intervals.

3. A control device for an electrical precipitator device having a set of electrodes charged to a high unidirectional potential and adapted to cause the ionization and the precipitation of suspended particles from gases passed through the region of said electrodes comprising in combination a source of alternating current, a step-up transformer having a tapped primary winding, an adjustable resistance connected in series with said source of current and with said primary winding, rotary means for sequentially adjusting said resistance and the taps of said primary winding, a reversible motor for driving said rotary means adapted when energized to vary the high alternating voltage across the secondary winding of said transformer, rectifying means connected to said secondary winding adapted to maintain high unidirectional potential on said electrodes, a reversing relay for controlling the operation of said motor, current balance means responsive to all changes of current in the primary circuit of said transformer and adapted to actuate said reversing relay and said motor in the "raise-voltage" direction when said current is below a predetermined value and in the "lower-voltage" direction when such current is above said value, means for adjusting said predetermined value, surge-actuated means responsive to sudden changes of current flow in said primary circuit to condition the operation of said current balance means and to maintain the secondary voltage substantially at the snapping value, and means for disabling said relay and said surge-actuated means during tap-changing intervals.

4. A control device for an electrical precipitator device having a set of electrodes charged to a high unidirectional potential and adapted to cause the ionization and the precipitation of suspended particles from gases passed through the region of said electrodes comprising in combination a source of alternating current, a step-up transformer having its primary winding connected to said source of current and having a high alternating voltage across its secondary winding, current regulator means including an electromotor and a reversing relay for adjusting said secondary voltage, rectifying means connected to said secondary winding adapted to maintain high unidirectional potential on said electrodes, a current balance relay responsive to current changes and adapted to actuate said regulator means to maintain said current at a predetermined value, a rate-of-change relay responsive to surges in said current, and a time delay relay under the control of said rate-of-change relay adapted to cause actuation of said current balance relay and the current regulator means operatively associated therewith in the "lower-voltage" direction when snaps occur more frequently than a predetermined time interval and to cause actuation in the "raise-voltage" direction when snaps occur less frequently than such interval whereby the voltage between said precipitator electrodes will be maintained substantially at the snapping value.

5. A control system for an electrical precipitator device having a set of electrodes charged to a high unidirectional potential and adapted to cause the ionization and the precipitation of suspended particles from gases passed through the region of said electrodes comprising in combination a source of alternating current, a step-up transformer having its primary winding adapted to maintain high unidirectional potential on said electrodes connected to said source of current and having a high alternating voltage across its secondary winding, current regulator means including an electromotor and a reversing relay for adjusting said secondary voltage, rotary synchronous rectifying means connected to said secondary winding, a polarity selector device for said rectifying means, a current balance relay responsive to current changes from a predetermined value and adapted to actuate said regulator means to maintain said current at said value, means for adjusting said predetermined current value, a rate-of-change relay responsive to surges in said current, a time delay relay under the control of said rate-of-change relay adapted to cause actuation of said current balance relay and of the current regulator means operatively associated therewith in the "lower-voltage" direction when snaps occur more frequently than a predetermined time interval and to cause actuation in the "raise-voltage" direction when snaps occur less frequently than such interval whereby the voltage between said precipitator electrodes will be maintained substantially at the snapping value, and means for disabling said reversing relay and said rate-of-change relay during surges caused by the operation of said current regulator means and independent of snaps.

6. A control system for an electrical precipitator device having a set of electrodes charged to a high unidirectional potential and adapted to cause the ionization and the precipitation of suspended particles from gases passed through the region of said electrodes comprising in combination a source of alternating current, a step-up transformer having its primary winding connected to said source, rectifying means connected to the secondary winding of said transformer adapted to maintain high unidirectional potential on said electrodes, means for controlling the output voltage of said step-up transformer, and surge-actuated means responsive to sudden changes of current flow in the primary circuit of said transformer for adjusting said controlling means to increase the potential on said electrodes when such surges occur less frequently than a predetermined time interval between surges and to decrease the potential on said electrodes when such surges occur more frequently than a predetermined time interval.

HOWARD E. CORBITT.